(12) United States Patent
Chiera et al.

(10) Patent No.: US 9,476,347 B2
(45) Date of Patent: Oct. 25, 2016

(54) CONTROLLED SPARK IGNITED FLAME KERNEL FLOW IN FUEL-FED PRECHAMBERS

(75) Inventors: Domenico Chiera, Fort Collins, CO (US); David C. Petruska, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 1035 days.

(21) Appl. No.: 13/347,448

(22) Filed: Jan. 10, 2012

(65) Prior Publication Data

US 2012/0125287 A1 May 24, 2012
US 2013/0042834 A9 Feb. 21, 2013

Related U.S. Application Data

(63) Continuation-in-part of application No. 13/042,599, filed on Mar. 8, 2011, now Pat. No. 9,172,217.

(60) Provisional application No. 61/416,588, filed on Nov. 23, 2010.

(51) Int. Cl.
*F02B 19/10* (2006.01)
*F02B 19/12* (2006.01)
(Continued)

(52) U.S. Cl.
CPC ............... *F02B 19/12* (2013.01); *F02B 19/16* (2013.01); *H01T 13/32* (2013.01); *H01T 13/54* (2013.01); *F02P 9/007* (2013.01); *F02P 13/00* (2013.01); *Y02T 10/125* (2013.01)

(58) Field of Classification Search
CPC ... Y02T 10/125; Y02T 10/123; F02B 19/12; F02B 19/108; F01C 1/22
USPC .......................................... 123/251, 275, 209
See application file for complete search history.

(56) References Cited

U.S. PATENT DOCUMENTS

| | | | |
|---|---|---|---|
| 892,296 A | 6/1908 | Oberhansli | |
| 1,009,867 A | 11/1911 | Terry | |

(Continued)

FOREIGN PATENT DOCUMENTS

| | | |
|---|---|---|
| AT | 410007 | 1/2003 |
| AT | 509876 | 12/2011 |

(Continued)

OTHER PUBLICATIONS

Authorized Officer Martinez Cebollada, PCT International Search Report and Written Opinion of the International Searching Authority, PCT/US2014/041758, Sep. 10, 2014, 11 pages.

(Continued)

*Primary Examiner* — Hai Huynh
*Assistant Examiner* — Raza Najmuddin
(74) *Attorney, Agent, or Firm* — Fish & Richardson P.C.

(57) ABSTRACT

A pre-chamber spark plug that includes a shell. Additionally, the pre-chamber spark plug includes an insulator disposed within the shell. In a particular embodiment, a center electrode has a first portion surrounded by the insulator, and a second portion that extends from the insulator into a pre-chamber. The pre-chamber defined by the shell. In a further embodiment, a ground electrode is attached to the insulator. In particular embodiments, the ground electrode is tubular in shape and includes an inner spark surface ring spaced in surrounding relation to the center electrode to create a spark gap, an outer ring attached to the shell, and a plurality of rounded spokes connecting the inner and outer rings. In a particular embodiment, the ground and center electrodes accommodate attachment of precious metal alloys to increase electrode surface life. In another embodiment the ground electrode and insulator is coaxial to the center electrode.

36 Claims, 10 Drawing Sheets

(51) Int. Cl.
  *F02B 19/16*    (2006.01)
  *H01T 13/32*    (2006.01)
  *H01T 13/54*    (2006.01)
  *F02P 9/00*     (2006.01)
  *F02P 13/00*    (2006.01)

(56) References Cited

U.S. PATENT DOCUMENTS

| | | | |
|---|---|---|---|
| 1,242,375 A | 10/1917 | Robinson | |
| 1,253,570 A | 1/1918 | Berry | |
| 1,320,115 A | 10/1919 | Bloomhuff et al. | |
| 1,322,493 A | 11/1919 | Little | |
| 1,325,439 A | 12/1919 | Dinger | |
| 1,360,294 A | 11/1920 | Hill | |
| 1,361,347 A | 12/1920 | Nighswander | |
| 1,361,580 A | 12/1920 | Herz | |
| 1,538,750 A | 5/1925 | Scognamillo | |
| 1,596,240 A | 8/1926 | Dikeman | |
| 1,611,856 A | 12/1926 | Farnsworth | |
| 1,700,603 A | 1/1929 | Vreeland et al. | |
| 1,732,827 A | 10/1929 | Adam | |
| 1,748,338 A | 2/1930 | Georgias | |
| 1,963,801 A | 6/1934 | O'Marra | |
| 2,047,575 A | 7/1936 | Burtnett | |
| 2,127,513 A | 8/1938 | Harper, Jr. | |
| 2,153,598 A | 4/1939 | Steward | |
| 2,208,030 A | 7/1940 | Holmes | |
| 2,231,173 A * | 2/1941 | Starr | F02M 69/00 123/261 |
| 2,299,924 A | 10/1942 | Ost | |
| 2,314,128 A | 3/1943 | Coldwell | |
| 2,416,107 A | 2/1947 | Litton | |
| 2,456,080 A | 12/1948 | Wu Pe | |
| 2,487,535 A | 11/1949 | Fernandez | |
| 2,497,862 A | 2/1950 | Chuy | |
| 2,509,538 A | 5/1950 | Sues | |
| 2,586,864 A | 2/1952 | Rose | |
| 2,614,546 A | 10/1952 | Schwarz | |
| 2,673,554 A | 3/1954 | Thaheld | |
| 2,758,576 A | 8/1956 | Schlamann | |
| 2,776,394 A | 1/1957 | Cuny et al. | |
| 2,843,780 A | 7/1958 | Harper, Jr. | |
| 2,895,069 A | 7/1959 | Davis | |
| 2,899,585 A | 8/1959 | Dollenberg | |
| 2,957,099 A | 10/1960 | Dutterer | |
| 3,230,939 A | 1/1966 | Abramovich | |
| 3,270,722 A | 9/1966 | Springer | |
| 3,300,672 A | 1/1967 | Fisher | |
| 3,665,902 A | 5/1972 | Bloomfield | |
| 3,710,764 A | 1/1973 | Jozlin | |
| 3,718,425 A | 2/1973 | Weyl et al. | |
| 3,911,874 A | 10/1975 | Vincent | |
| 3,911,878 A | 10/1975 | Hofbauer et al. | |
| 3,958,144 A | 5/1976 | Franks | |
| 4,004,413 A | 1/1977 | Ueno | |
| 4,091,772 A | 5/1978 | Heater | |
| 4,092,558 A | 5/1978 | Yamada | |
| 4,098,232 A * | 7/1978 | Gleiter | F02B 19/12 123/261 |
| 4,123,998 A | 11/1978 | Heintzelman | |
| 4,124,000 A | 11/1978 | Genslak | |
| 4,125,094 A | 11/1978 | Noguchi et al. | |
| 4,218,993 A | 8/1980 | Blackburn | |
| 4,232,638 A | 11/1980 | Takahashi | |
| 4,248,189 A | 2/1981 | Barber et al. | |
| 4,248,192 A | 2/1981 | Lampard | |
| 4,372,264 A | 2/1983 | Trucco | |
| 4,398,513 A | 8/1983 | Tanasawa | |
| 4,406,260 A | 9/1983 | Burley | |
| 4,416,228 A | 11/1983 | Benedikt et al. | |
| 4,424,780 A | 1/1984 | Trucco | |
| 4,429,669 A | 2/1984 | Burley | |
| 4,441,469 A | 4/1984 | Wilke | |
| 4,452,189 A | 6/1984 | Latsch et al. | |
| 4,490,122 A | 12/1984 | Tromeur | |
| 4,509,476 A | 4/1985 | Breuser et al. | |
| 4,532,899 A | 8/1985 | Lorts | |
| 4,641,616 A | 2/1987 | Lampard | |
| 4,646,695 A | 3/1987 | Blackburn | |
| 4,744,341 A | 5/1988 | Hareyama et al. | |
| 4,765,293 A | 8/1988 | Gonzalez | |
| 4,795,937 A | 1/1989 | Wagner et al. | |
| 4,854,281 A | 8/1989 | Hareyama et al. | |
| 4,901,688 A * | 2/1990 | Kashiwara | H01T 13/467 123/169 E |
| 4,930,473 A | 6/1990 | Dietrich | |
| 4,963,784 A | 10/1990 | Niessner | |
| 4,987,868 A | 1/1991 | Richardson | |
| 5,014,656 A | 5/1991 | Leptich et al. | |
| 5,051,651 A * | 9/1991 | Kashiwara | H01T 13/32 313/139 |
| 5,067,458 A | 11/1991 | Bailey | |
| 5,076,229 A | 12/1991 | Stanley | |
| 5,091,672 A | 2/1992 | Below | |
| 5,105,780 A | 4/1992 | Richardson | |
| 5,107,168 A | 4/1992 | Friedrich et al. | |
| 5,222,993 A | 6/1993 | Crane | |
| 5,224,450 A | 7/1993 | Paul et al. | |
| 5,239,959 A | 8/1993 | Loth et al. | |
| 5,245,963 A | 9/1993 | Sabol et al. | |
| 5,271,365 A | 12/1993 | Oppenheim | |
| 5,369,328 A | 11/1994 | Gruber et al. | |
| 5,408,961 A | 4/1995 | Smith | |
| 5,421,300 A | 6/1995 | Durling et al. | |
| 5,430,346 A | 7/1995 | Johnson | |
| 5,454,356 A | 10/1995 | Kawamura | |
| 5,554,908 A | 9/1996 | Kuhnert et al. | |
| 5,555,862 A | 9/1996 | Tozzi | |
| 5,555,867 A | 9/1996 | Freen | |
| 5,555,868 A | 9/1996 | Neumann | |
| 5,560,326 A | 10/1996 | Merritt | |
| 5,612,586 A | 3/1997 | Benedikt et al. | |
| 5,619,959 A | 4/1997 | Tozzi | |
| 5,623,179 A | 4/1997 | Buhl | |
| 5,632,253 A | 5/1997 | Paul et al. | |
| 5,647,444 A | 7/1997 | Williams | |
| 5,662,181 A | 9/1997 | Williams et al. | |
| 5,715,788 A | 2/1998 | Tarr | |
| 5,791,374 A | 8/1998 | Black et al. | |
| 5,799,637 A | 9/1998 | Cifuni | |
| 5,803,026 A | 9/1998 | Merritt | |
| 5,821,675 A | 10/1998 | Suzuki | |
| 5,829,407 A | 11/1998 | Watson | |
| 5,892,319 A | 4/1999 | Rossi | |
| 5,947,076 A | 9/1999 | Srinivasan et al. | |
| 6,013,973 A | 1/2000 | Sato | |
| 6,060,822 A | 5/2000 | Krupa et al. | |
| 6,064,144 A | 5/2000 | Knoll et al. | |
| 6,095,111 A | 8/2000 | Ueda | |
| 6,129,069 A | 10/2000 | Uitenbroek | |
| 6,129,152 A | 10/2000 | Hosie et al. | |
| 6,130,498 A | 10/2000 | Shimizu et al. | |
| 6,198,209 B1 | 3/2001 | Baldwin et al. | |
| 6,302,067 B1 | 10/2001 | Merritt | |
| 6,305,346 B1 | 10/2001 | Ueda et al. | |
| 6,318,335 B2 | 11/2001 | Tomczyk | |
| 6,326,719 B1 | 12/2001 | Boehler et al. | |
| 6,340,013 B1 | 1/2002 | Britton | |
| 6,460,506 B1 | 10/2002 | Nevinger | |
| 6,495,948 B1 | 12/2002 | Garrett, III | |
| 6,554,016 B2 | 4/2003 | Kinder | |
| 6,574,961 B2 | 6/2003 | Shiraishi | |
| 6,595,182 B2 | 7/2003 | Oprea | |
| 6,611,083 B2 | 8/2003 | LaBarge et al. | |
| 6,670,740 B2 | 12/2003 | Landon, Jr. | |
| 6,749,172 B2 | 6/2004 | Kinder | |
| 6,830,017 B2 | 12/2004 | Wolf et al. | |
| 6,913,092 B2 | 7/2005 | Bourgoyne et al. | |
| 7,004,444 B2 | 2/2006 | Kinder | |
| 7,007,661 B2 | 3/2006 | Warlick | |
| 7,007,913 B2 | 3/2006 | Kinder | |
| 7,025,036 B2 | 4/2006 | Lampard | |
| 7,086,376 B2 | 8/2006 | McKay | |
| 7,100,567 B1 | 9/2006 | Bailey et al. | |

(56) References Cited

U.S. PATENT DOCUMENTS

| | | | |
|---|---|---|---|
| 7,104,245 B2 | 9/2006 | Robinet et al. | |
| 7,367,307 B2 | 5/2008 | Lampard | |
| 7,408,293 B2 | 8/2008 | Francesconi et al. | |
| 7,409,933 B2 | 8/2008 | Nino | |
| 7,438,043 B2 | 10/2008 | Shiraishi | |
| 7,615,914 B2 | 11/2009 | Francesconi et al. | |
| 7,628,130 B2 | 12/2009 | Johng | |
| 7,659,655 B2 | 2/2010 | Tozzi et al. | |
| 7,762,320 B2 | 7/2010 | Williams | |
| 7,848,871 B2 | 12/2010 | Onishi | |
| 7,856,956 B2 | 12/2010 | Inoue et al. | |
| 7,891,426 B2 | 2/2011 | Williams | |
| 7,922,551 B2 | 4/2011 | Tozzi | |
| 7,950,364 B2 | 5/2011 | Nerheim | |
| 8,033,335 B2 | 10/2011 | Orbell et al. | |
| 8,143,772 B2 | 3/2012 | Francesconi | |
| 8,181,617 B2 | 5/2012 | Kuhnert et al. | |
| 8,261,711 B2 | 9/2012 | Shimoda | |
| 8,286,734 B2 | 10/2012 | Hannegan et al. | |
| 8,313,324 B2 | 11/2012 | Bulat et al. | |
| 8,322,432 B2 | 12/2012 | Bailey et al. | |
| 8,353,337 B2 | 1/2013 | Bailey et al. | |
| 8,387,587 B2 | 3/2013 | Ogata | |
| 8,499,854 B2 | 8/2013 | Mitchell et al. | |
| 8,733,331 B2 | 5/2014 | McAlister | |
| 8,757,129 B1 | 6/2014 | Hill | |
| 8,800,536 B2 | 8/2014 | Plata | |
| 8,857,405 B2 | 10/2014 | Attard | |
| 8,890,396 B2* | 11/2014 | Ernst | H01T 13/467 313/140 |
| 8,924,136 B2 | 12/2014 | Nakamoto | |
| 8,925,518 B1 | 1/2015 | Riley | |
| 9,172,216 B2 | 10/2015 | Ernst | |
| 2004/0061421 A1 | 4/2004 | Morita et al. | |
| 2004/0100179 A1* | 5/2004 | Boley | H01T 13/54 313/143 |
| 2005/0000484 A1 | 1/2005 | Schultz et al. | |
| 2005/0092285 A1 | 5/2005 | Klonis et al. | |
| 2005/0211217 A1 | 9/2005 | Boley et al. | |
| 2005/0279321 A1 | 12/2005 | Crawford | |
| 2006/0005803 A1 | 1/2006 | Robinet et al. | |
| 2006/0278195 A1 | 12/2006 | Hotta | |
| 2007/0069617 A1 | 3/2007 | Tozzi et al. | |
| 2007/0169737 A1 | 7/2007 | Gong et al. | |
| 2007/0236122 A1 | 10/2007 | Borror | |
| 2007/0261672 A1 | 11/2007 | Lippert | |
| 2008/0017165 A1 | 1/2008 | Schubert | |
| 2008/0168963 A1 | 7/2008 | Gagliano | |
| 2008/0257301 A1 | 10/2008 | Hotta | |
| 2009/0236144 A1 | 9/2009 | Todd et al. | |
| 2009/0241896 A1 | 10/2009 | Fiveland | |
| 2009/0309475 A1 | 12/2009 | Tozzi | |
| 2010/0132660 A1* | 6/2010 | Nerheim | F02B 19/1014 123/260 |
| 2010/0133977 A1 | 6/2010 | Kato | |
| 2010/0147259 A1 | 6/2010 | Kuhnert et al. | |
| 2011/0036638 A1 | 2/2011 | Sokol et al. | |
| 2011/0062850 A1 | 3/2011 | Tozzi | |
| 2011/0065350 A1 | 3/2011 | Burke | |
| 2011/0089803 A1 | 4/2011 | Francesconi | |
| 2011/0148274 A1* | 6/2011 | Ernst | H01T 13/467 313/141 |
| 2011/0297121 A1 | 12/2011 | Kraus et al. | |
| 2011/0308489 A1 | 12/2011 | Herden | |
| 2011/0320108 A1 | 12/2011 | Morinaga | |
| 2012/0000664 A1 | 1/2012 | Nas et al. | |
| 2012/0013133 A1 | 1/2012 | Rios, III et al. | |
| 2012/0064465 A1 | 3/2012 | Borissov et al. | |
| 2012/0103302 A1* | 5/2012 | Attard | F02B 19/12 123/260 |
| 2012/0118262 A1 | 5/2012 | Johnson | |
| 2012/0125279 A1 | 5/2012 | Hampson et al. | |
| 2012/0125287 A1 | 5/2012 | Chiera et al. | |
| 2012/0125636 A1 | 5/2012 | Linde et al. | |
| 2012/0299459 A1 | 11/2012 | Sakakura | |
| 2012/0310510 A1 | 12/2012 | Imamura | |
| 2013/0000598 A1 | 1/2013 | Tokuoka | |
| 2013/0047954 A1 | 2/2013 | McAlister | |
| 2013/0055986 A1 | 3/2013 | Tozzi et al. | |
| 2013/0099653 A1 | 4/2013 | Ernst | |
| 2013/0139784 A1 | 6/2013 | Pierz | |
| 2013/0160734 A1* | 6/2013 | Redtenbacher | F02B 19/1004 123/253 |
| 2013/0179050 A1 | 7/2013 | Munshi | |
| 2013/0192896 A1 | 8/2013 | Bailey et al. | |
| 2013/0206122 A1 | 8/2013 | Chiera et al. | |
| 2013/0220269 A1 | 8/2013 | Woo et al. | |
| 2014/0076274 A1 | 3/2014 | Tozzi et al. | |
| 2014/0083391 A1 | 3/2014 | Gruber | |
| 2014/0102404 A1 | 4/2014 | Sotiropoulou et al. | |
| 2014/0137840 A1 | 5/2014 | McAlister | |
| 2014/0144406 A1 | 5/2014 | Schock | |
| 2014/0165980 A1 | 6/2014 | Chiera et al. | |
| 2014/0209057 A1 | 7/2014 | Pouring | |
| 2014/0261294 A1 | 9/2014 | Thomassin | |
| 2015/0020769 A1 | 1/2015 | Huang | |
| 2015/0040845 A1 | 2/2015 | Chiera et al. | |
| 2015/0068489 A1 | 3/2015 | Bunce | |
| 2015/0075506 A1 | 3/2015 | Ishida | |
| 2015/0128898 A1 | 5/2015 | Osaka | |
| 2015/0260131 A1 | 9/2015 | Riley | |
| 2015/0267631 A1 | 9/2015 | Miyamoto | |
| 2015/0354481 A1 | 12/2015 | Geckler | |
| 2016/0010538 A1 | 1/2016 | Suzuki | |
| 2016/0017845 A1 | 1/2016 | Huang | |
| 2016/0024994 A1 | 1/2016 | Engineer | |
| 2016/0047323 A1 | 2/2016 | Suzuki | |
| 2016/0053668 A1 | 2/2016 | Loetz | |

FOREIGN PATENT DOCUMENTS

| | | |
|---|---|---|
| CA | 1010329 A1 | 5/1977 |
| CA | 2320415 A1 | 3/2001 |
| CN | 2825995 Y | 10/2006 |
| DE | 31 20 007 | 12/1982 |
| DE | 3230793 | 2/1984 |
| DE | 3913665 | 10/1990 |
| DE | 4422939 A1 | 1/1996 |
| DE | 19624965 | 1/1998 |
| DE | 10143209 A1 | 6/2002 |
| DE | 101 44 976 A1 | 4/2003 |
| DE | 1020100048 | 6/2011 |
| DE | 102011006597 A1 | 3/2012 |
| DE | 102012021842 B4 | 9/2014 |
| EP | 0 675 272 A1 | 10/1995 |
| EP | 0971107 | 1/2000 |
| EP | 1026800 A2 | 8/2000 |
| EP | 1028506 A1 | 8/2000 |
| EP | 0937196 | 9/2000 |
| EP | 1265329 A1 | 12/2002 |
| EP | 1556592 | 10/2003 |
| EP | 1556932 A1 | 7/2005 |
| EP | 1701419 | 9/2006 |
| FI | 121759 | 3/2011 |
| FI | 122501 | 2/2012 |
| FR | 577766 A | 9/1924 |
| FR | 764079 A | 5/1934 |
| FR | 985788 A | 7/1951 |
| FR | 2071129 A5 | 9/1971 |
| FR | 2131938 A2 | 11/1972 |
| FR | 2131938 B2 | 8/1979 |
| FR | 2846042 A1 | 4/2004 |
| GB | 588074 | 5/1947 |
| JP | 50077738 A | 6/1975 |
| JP | S5252013 | 4/1977 |
| JP | 57-018283 | 1/1982 |
| JP | 58162719 A | 9/1983 |
| JP | H02148588 U | 12/1990 |
| JP | 03-011575 | 1/1992 |
| JP | 4133281 A | 5/1992 |
| JP | 4262388 A | 9/1992 |
| JP | 08-260970 | 10/1996 |
| JP | 09166024 | 6/1997 |
| JP | 2008-504649 | 2/2006 |

(56) References Cited

FOREIGN PATENT DOCUMENTS

| RU | 2116474 | 7/1998 |
|---|---|---|
| SU | 968493 | 10/1982 |
| SU | 1370269 | 1/1988 |
| WO | WO 87/07777 A1 | 12/1987 |
| WO | WO 91/06142 A1 | 5/1991 |
| WO | WO 92/02718 A1 | 2/1992 |
| WO | WO 2004/036013 | 4/2004 |
| WO | WO 2004/036709 | 4/2004 |
| WO | WO 2004/107518 A1 | 12/2004 |
| WO | WO 2006/011950 | 2/2006 |
| WO | WO 2009/060119 A1 | 5/2009 |
| WO | WO 2009/109694 A2 | 9/2009 |
| WO | WO 2009/130376 A1 | 10/2009 |
| WO | WO 2010/072519 | 7/2010 |
| WO | WO 2011/031136 | 3/2011 |
| WO | WO2011085853 | 7/2011 |
| WO | WO 2011/101541 | 8/2011 |
| WO | WO 2011/128190 | 10/2011 |
| WO | WO2011151035 | 12/2011 |
| WO | WO 2012/021914 A1 | 2/2012 |
| WO | WO 2012/091739 | 7/2012 |
| WO | WO2014/201030 | 12/2014 |

OTHER PUBLICATIONS

Maria-Emmanuella McCoole, M.Sc.E.E. et al.; Solutions for Improving Spark Plug Life in High Efficiency, High Power Density, Natural Gas Engines; Proceedings of ICES2006; ASME Internal Combustion Engine Division 2006 Spring Technical Conference; May 8-10, 2006; Aachen, Germany; ICES2006-1417; pp. 1-8.

Dr. Luigi Tozzi et al.; Advanced Combustion System Solutions for Increasing Thermal Efficiency in Natural Gas Engines While Meeting Future Demand for Low NOx Emissions; Proceedings of JRCICE2007; 2007 ASME/IEEE Joint Rail Conference & Internal Combustion Engine Spring Technical Conference; Mar. 13-16, 2006; Pueblo, Colorado USA; JRCICE2007-40026; pp. 1-7.

Jessica Adair et al.; Knock Characterization Using Ionization Detection; GMRC Gas Machinery Conference; Oklahoma City, Oklahoma; Oct. 2006; pp. 1-23.

Hironori Osamura; Development of Long Life and High Ignitability Iridium Spark Plug; Technical Paper; Seoul 2000 FISITA World Automotive Congress; Jun. 12-15, 2000; Seoul, Korea; 6 pages.

Hironori Osamura et al.; Development of New Iridium Alloy for Spark Plug Electrodes; SAE Technical Paper Series; 1999-01-0796; SI Engine Components and Technology (SP-1437); International Congress and Exposition; Mar. 1-4, 1999; 14 pages.

Chiera et al., "Multi-Chamber Igniter", U.S. Appl. No. 13/736,424, filed Jun. 10, 2013, 28 pages.

Chiera et al., "Quiescent Chamber Hot Gas Igniter", U.S. Appl. No. 13/913,840, filed Jan. 8, 2013, 33 pages.

Fino Scholl et al., "Development and Analysis of a Controlled Hot Surface Ignition System for Lean Burn Gas Engines" Proceedings of the ASME 2012 Internal Combustion Engine Division Spring Technical Conference ICES2012, May 6-9, 2012 (12 pages).

Sachin Joshi et al., "On Comparative Performance Testing of Prechamber and Open Chamber Laser Ignition" Journal of Engineering for Gas Turbines and Power, Dec. 2011, vol. 133, pp. 122801-1 to 122801-5.

McIntyre, Dustin L., et al., "Lean-Burn Stationary Natural Gas Reciprocating Engine Operation with a Prototype Miniature Diode Side Pumped Passively Q-Switched Laser Spark Plug" U.S. Department of Energy, National Energy Technology Laboratory, 2008, 14 pages.

Dale, J.D. et al., "Enhanced Ignition for I. C. Engines With Premixed Charge," Lawrence Berkeley Laboratory, Society of Automotive Engineers Annual Congress, Oct. 1980, 52 pages.

"New Spark Plug Concepts for Modern-Day Gasoline Engines," Beru Aktiengesellschaft, MTZ vol. 68, Feb. 2007, 8 pages.

BorgWarner BERU Systems Pre-Chamber Technology, 1 page.

BorgWarner BERU Systems, BERU Industrial Spark Plugs, Feb. 2012, 48 pages.

"Wartsila 34SG Engine Technology for Compressor Drive," Wartsila Engines, Wartsila Corporation 2009, 16 pages.

U.S. Appl. No. 13/042,599, filed Mar. 8, 2011, Gregory James Hampson.

Federal Mogul, Champion® Bridge Iridium Spark Plug, Industrial Gas Stationary Engines—High Demand/Premium Market, Jun. 2012, 1 page.

Office Action issued in Japanese Application No. 2012-057173 on Jan. 5, 2016; 5 pages.

BOSCH, Spark Plugs Technical Information, published on or before Nov. 28, 2014, 28 pages.

Chiera et al., "Cap Shielded Ignition System", U.S. Appl. No. 14/664,431, filed Mar. 20, 2015, 22 pages.

\* cited by examiner

CONTROLLED SPARK IGNITED FLAME KERNEL FLOW IN FUEL-FED PRECHAMBERS

CROSS-REFERENCE TO RELATED PATENT APPLICATIONS

This patent application is a Continuation-in-Part of U.S. patent application Ser. No. 13/042,599, filed Mar. 8, 2011, which claims the benefit of U.S. Provisional Patent Application No. 61/416,588, filed Nov, 23, 2010, the entire teachings and disclosure of which are incorporated herein by reference thereto.

FIELD OF THE INVENTION

This invention generally relates to spark plugs for internal combustion engines, and, more particularly, to spark plugs having a pre-combustion chamber, or pre-chamber.

BACKGROUND OF THE INVENTION

Engines operating on gaseous fuels, such as natural gas, are commonly supplied with a lean fuel mixture, which is a mixture of air and fuel containing a excess air beyond that which is "chemically correct" or stoichiometric. The lean fuel mixture often results in poor combustion such as misfires, incomplete combustion and poor fuel economy and often efforts to improve combustion lead to detonation or the use of high energy spark that leads to short spark plug life. One factor that can lead to such events is the poor ability of conventional spark plugs to effectively and consistently ignite a lean fuel mixture in the cylinder of the operating engine. More effective combustion of lean fuel mixtures can be achieved using a pre-combustion chamber, or pre-chamber.

Pre-chamber spark plugs are typically used to enhance the lean flammability limits in lean burn engines such as natural gas lean burn engines or automotive lean gasoline engines. In known pre-chamber spark plugs, such as the pre-chamber spark plug disclosed in U.S. Pat. No. 5,554,908, the spark gap is confined in a cavity having a volume that may represent a relatively small fraction of the total engine cylinder displacement. In some embodiments, a portion of the cavity is shaped as a dome and has various tangential induction/ejection holes. During operation, as the engine piston moves upward during the compression cycle, air/fuel mixture is forced through the induction holes in the pre-chamber. The orientation of the holes may determine the motion of the air/fuel mixture inside of the pre-chamber cavity and the reacting jet upon exiting the pre-chamber.

When the burn rate of the air/fuel mixture in the pre-chamber cavity is increased, the result is more highly penetrating flame jets into the engine combustion chamber. These flame jets improve the ability of the engine to achieve a more rapid and repeatable flame propagation in the engine combustion chamber at leaner air/fuel mixtures. Many conventional pre-chamber spark plugs have non-repeatable and unpredictable performance characteristics which may lead to a higher than desired coefficient of variation (COV) and misfire, which is a measure of roughness. Further, many conventional pre-chamber spark plugs are sensitive to manufacturing variation and suffer from poor burned gas scavenging, which further leads to increased COV.

One of the challenges in spark plug design is to create a plug capable of achieving a repeatable and controllable ignition delay time during the combustion process, in spite of the fact that, in internal combustion engines, the fresh charge will not usually be homogeneous or repeatable from cycle to cycle in many aspects (e.g., equivalence ratio, turbulence, temperature, residuals). It is also desirable to have a spark plug that is relatively insensitive to variations in manufacturing or components or the assembly thereof.

Another challenge in spark plug design is premature spark plug wear. Typically, premature spark plug wear is caused by a high combustion temperature of the stoichiometric mixture. It is not uncommon for a spark plug in high BMEP engine applications to last only 800 to 1000 hours before it needs to be replaced. This can lead to unscheduled downtime for the engine and therefore increased operational costs for the engine operator.

Embodiments of the invention provide a spark plug that generates high velocity flame jets with very low COV and long operating life—the benefits of which are faster combustion in the main chamber leading to improved NOx vs. fuel consumption (or efficiency) trade-offs. These and other advantages of the invention, as well as additional inventive features, will be apparent from the description of the invention provided herein.

BRIEF SUMMARY OF THE INVENTION

In one aspect, embodiments of the invention provide a pre-chamber spark plug that includes a shell, and an end cap attached to the shell, a center electrode and ground electrode. Additionally, the pre-chamber spark plug includes an insulator disposed within the shell. In a particular embodiment, the center electrode has a first portion surrounded by the insulator, and a second portion that extends from the insulator into a pre-chamber. The pre-chamber volume is defined by the shell and end cap. In a further embodiment, the ground electrode is attached to the shell. In particular embodiments, the ground electrode includes an inner ring spaced in surrounding relation to the center electrode, an outer ring attached to the shell, and a plurality of spokes connecting the inner and outer rings. In a particular embodiment, the ground electrode has a tubular shape which serves to protect the incoming central hole flow (primary) passing through the gap between the center and ground electrode from disturbances from the flow entering via lateral (secondary) holes. The tubular shape also directs the lateral hole flow behind the ground electrode at the periphery to join the spark kernel as it exits the gap. Additionally, the center electrode has an aerodynamic shape which improves the flow stream line through the gap from the center hole.

In another aspect, embodiments of the invention provide a method of facilitating combustion in an internal combustion engine. The method includes igniting an air/fuel mixture in a pre-chamber of a pre-chamber spark plug. In a particular embodiment, igniting an air/fuel mixture in a pre-chamber includes providing a first port to permit the flow of a first amount of air/fuel mixture into a gap between the center and ground electrode with a predominant backward flow direction from the front chamber of the pre-chamber, and igniting the air/fuel mixture in the gap, wherein the ignition produces a flame kernel. Further, the method includes causing the flame kernel to be transported to a back chamber of the pre-chamber, and providing a second port to permit the flow of a secondary (Lateral) amount of air/fuel mixture into the front chamber, such that the secondary amount of air/fuel mixture flows to the back chamber to be ignited by the flame kernel. The secondary flow may also have swirl which serves to spread the developing flame in the back chamber in the azimuthal direction—such that azimuthal uniformity is improved and generate turbulence within the pre-chamber which further speed combustion. The ignition of the first and second amounts of air/fuel mixture creates a pressure rise in the pre-chamber which causes a flame jet to issue from the first and second ports. The port hole size and angle can be optimized to maximize the flame jet velocity and penetration into the main chamber, thus enhancing combustion in the main chamber. The hole size controls both the inflow and outflow and thus is optimized to achieve the desired engine specific ignition delay time, jet velocity, and flame jet penetration and thus main chamber combustion rates.

In yet another aspect, embodiments of the invention provide a pre-chamber spark plug that includes a shell, and an end cap attached to the shell. Additionally, the pre-chamber spark plug includes an insulator disposed within the shell. In a particular embodiment, a center electrode has a first portion surrounded by the insulator, and a second portion that extends from the insulator into a pre-chamber. The pre-chamber defined by the shell and end cap. In a further embodiment, a ground electrode is attached to the shell. In particular embodiments, the ground electrode includes an inner ring spaced in surrounding relation to the center electrode, and a plurality of spokes projecting radially outward from the inner ring which hold the ring in place. In an embodiment, the end of each spoke is attached to the shell.

Further, in another aspect, embodiments of the invention provide a method of manufacturing a pre-chamber spark plug. The method includes attaching a ground electrode to the shell. In a particular embodiment, the ground electrode comprises a tubular electrode. In at least one embodiment, the tubular electrode has an inner ring located in surrounding relation to the center electrode.

The method also includes attachment of precious metal (or Noble Metal) to the center electrode and to the ground electrode which represents the sparking surface. The method also includes the manufacturing process whereby the gap between the center electrode and the ground electrode is created with a gapping tool during manufacturing and assembly such that the gap is determined accurately during manufacturing and assembly—thus reducing the need for re-gapping after fabrication. In one embodiment, the gapping tool is inserted between the center electrode and the ground electrode prior to final attachment of the ground electrode to the shell. This gap is best maintained if this is the final heating step in the process. In another embodiment, the spark gap is created after attachment of the ground electrode via electron beam (EB), water jet, or other suitable material removal method to create a precise high tolerance gap. The ideal new plug gap ranges from 0.15 mm to 0.30 mm The particular arrangement of a tubular ground electrode with a concentric center electrode having created conditions for flow through the gap to the back side of the ground electrode can be accomplished in a pre-chamber in the head design which does not require the shell of the spark plug, where the cylinder head pre-chamber takes the place of the spark plug shell wall. Additionally, fuel may be added to either the pre-chamber spark plug or the pre-chamber in the head device to further extend the lean operating limit. These are referred to as "fuel-fed" devices.

In another embodiment, a pre-chamber spark plug comprises a shell, an insulator, a center electrode, and a ground electrode. The shell includes a plurality of ventilation holes. The insulator is disposed within the shell. The center electrode is surrounded by the insulator, and extends into a pre-chamber that is defined by the shell. The insulator is coaxial around the center electrode. The ground electrode is attached to the insulator and surrounding a distal end of the center electrode. The ground electrode comprises a tubular ring spaced in surrounding relation to the center electrode, and has a radial offset circumferential extension extending axially past the distal end of the center electrode forming a geometry which serves as an aerodynamic ram.

Another embodiment of the present invention includes a method of facilitating combustion in an internal combustion engine comprising several steps. An air/fuel mixture is ignited in a pre-chamber of a pre-chamber spark plug. Igniting the air/fuel mixture comprises providing a plurality of ventilation holes to permit a primary flow of an air/fuel mixture into a spark gap of the pre-chamber, and igniting the air/fuel mixture, wherein an ignition event produces a flame kernel. Next, the flame kernel is transported to a first stage of the pre-chamber wherein the first stage of the pre-chamber is defined by a cavity disposed between a ground electrode attached to an insulator that is coaxial to a center electrode that functions as a "flame holder" by creating a recirculation zone. After transporting the flame kernel into the first stage, a secondary flow of the air/fuel mixture is provided to the pre-chamber from the plurality of ventilation holes such that the secondary flow disperses throughout a second stage of the pre-chamber defined by a cavity disposed outside of the ground electrode attached to the insulator. Finally, the flame kernel travels from the first stage to the second stage igniting the secondary flow of the air/fuel mixture causing the flame to spread through-out the pre-chamber, burning the bulk of fuel in the pre-chamber, creating a large pressure rise and consequently a flame jet to issue from the plurality of ventilation holes.

In another embodiment of the present invention, a pre-chamber spark plug comprises a shell, an insulator, a center electrode and a ground electrode. The insulator is disposed within the shell. The center electrode has a first portion surrounded by the insulator, and has a second portion that extends from the insulator into a pre-chamber, which is defined by the shell. The ground electrode is attached to the insulator and comprises an inner ring spaced in surrounding relation to the center electrode forming a spark gap.

Another embodiment uses a laser light beam focused at a location between the gap surfaces, instead of an electric spark, to heat the AFR to ignition temperatures and create a flame kernel with photons instead of electrons. This embodiment includes a means to bring the light beam into and focus it into the gap region. The benefit of laser beam ignition is that it is far less sensitive to cylinder pressure conditions, where as an electric spark requires higher voltage to achieve break-down and spark as the pressure increases. The laser ignition method enables ignition at pressures above the break-down voltage limits of conventional electric ignition systems.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

To address the issues of a repeatable and controllable ignition delay time during the combustion process, which results in both a more efficient combustion process and longer life for the spark plug, a pre-chamber spark plug has been developed that incorporates a tubular electrode to control the flame kernel development, ignition delay time, flame jet evolution, main combustion chamber burn rate, and consequently improves engine performance. The delay time is the period between the spark and that time when the combustion affects a volume sufficient to increase the pressure in the pre-chamber and in turn the main combustion chamber.

Figure 1:
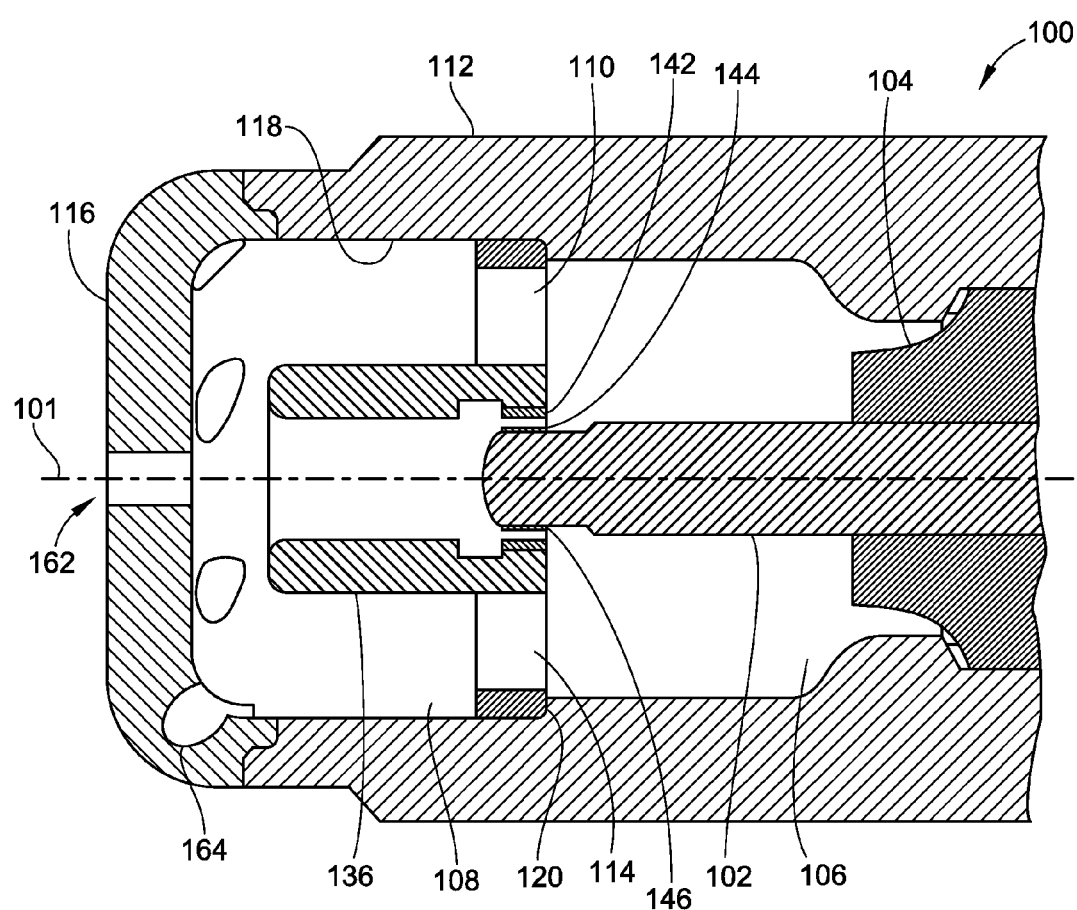
FIG. 1 illustrates a cross-sectional view of a portion of a pre-chamber spark plug, according to an embodiment of the invention.

FIG. 1 illustrates a cross-sectional view of a portion of a pre-chamber spark plug 100, according to an embodiment of the invention. The pre-chamber spark plug 100 has a longitudinal axis 101 and a center electrode 102 that extends along the longitudinal axis 101, and further extends from an insulator 104 into a pre-combustion chamber that is divided into a back chamber 106 and a front chamber 108. A tubular electrode 110, which serves as the ground electrode, is disposed inside a shell 112. In embodiments of the invention, the shell 112 is made from a high-strength metal capable of withstanding exposure to high temperatures. The disk portion 114 of the tubular electrode 110 separates the back chamber 106 from the front chamber 108. An end cap 116 defines an end of the pre-chamber volume of the spark plug 100 and also a boundary of the front chamber 108. As shown in FIG. 1, in a particular embodiment of the invention, an interior surface 118 of the shell 112 may have a stepped portion 120 such that the tubular electrode 110 can seat on the stepped portion 120 during assembly of the pre-chamber spark plug 100.

Figure 2:
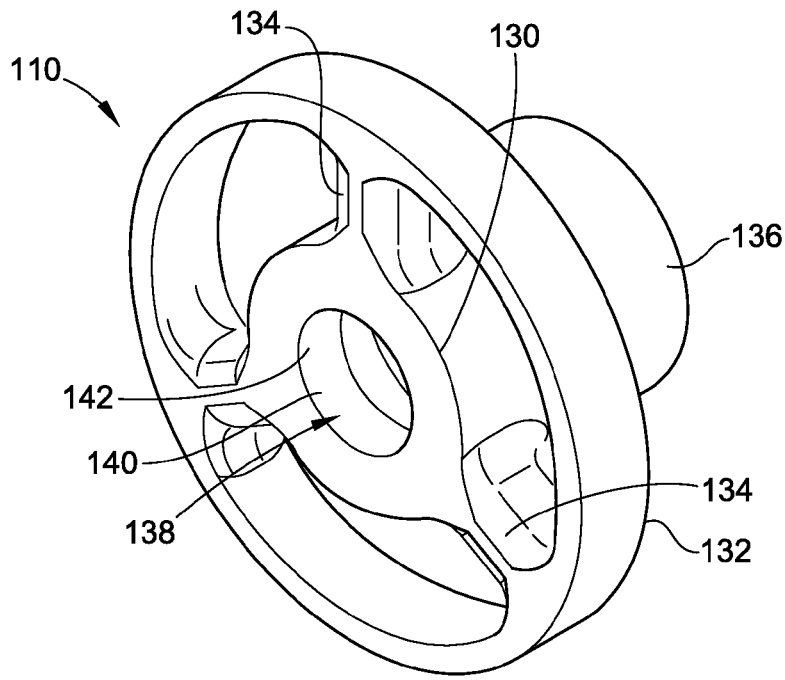
FIG. 2 is a perspective view of the tubular electrode, constructed in accordance with an embodiment of the invention.

FIG. 2 is a perspective view of the tubular electrode 110, constructed in accordance with an embodiment of the invention. The tubular electrode 110 has an inner ring 130 and an outer ring 132 imbedded within the tubular ground electrode 110. In the embodiment of FIG. 2, the inner ring 130 and outer ring 132 are connected by three spokes 134. Extending from the inner ring 130 in the center portion of the tubular electrode 110 is a tubular inner ring, or velocity control tube 136. In a particular embodiment of the invention, as illustrated in FIG. 1, the velocity control tube 136 extends away from the disk portion 114 in one direction into the front chamber 108. A central opening 138 extends through the inner ring 130 and the velocity control tube 136.

Still referring to FIG. 2, in an embodiment of the invention, the tubular electrode 110 is made from a copper alloy, a nickel alloy, or some other relatively highly-conductive metal. In a particular embodiment of the invention, a precious metal is attached to, or deposited on, an inner surface 140 of the inner ring 130. Precious metals are typically used on spark plug electrodes to increase the life of the spark plug and improve performance. The precious metals chosen for this application exhibit a high melting point, high conductivity, and increased resistance to oxidation. In embodiments of the invention, a first electrode surface ring 142 of, for example, platinum or alloys thereof, rhodium or alloys thereof, tungsten or alloys thereof, iridium or alloys thereof lines the inner surface 140 of the inner ring 130. In alternate embodiments, the inner surface 140 of the inner ring 130 is lined with an iridium-rhodium alloy or a nickel alloy. Referring again to FIG. 1, in particular embodiments of the invention, a second electrode surface ring 144, of the same or similar material as the first electrode surface ring 142, is attached to, or deposited on, an exterior surface 146 of the center electrode 102.

Referring again to FIG. 2, the spokes 134 may be square-edged for easy manufacturing or may have a curved contour so as to provide less resistance to gases flowing through the spaces between the spokes 134. In alternate embodiments of the invention, there may be a greater or fewer number of spokes connecting the inner ring 130 and outer ring 132. In an alternate embodiment of the invention, the tubular electrode 110 does not have an electrode surface ring made from a precious metal. In an exemplary embodiment, the entire tubular electrode 110 is made from a single material such as a nickel alloy.

Figure 3:
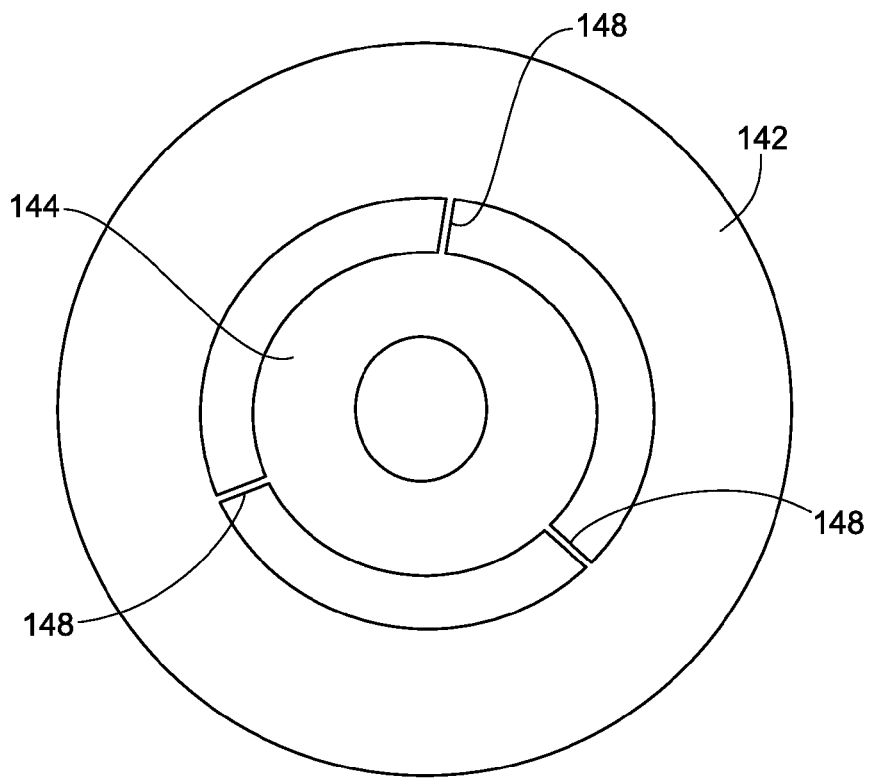
FIG. 3 illustrates an exemplary embodiment of the first and second electrode surface rings, in accordance with an embodiment of the invention.

The tubular electrode 110 may be cast or machined substantially as a single piece, though the first electrode surface ring may be a separate ring of some type of precious metal or similarly suitable metal. It is also envisioned that the tubular electrode 110 can be made from powdered metal, wherein the powdered metal is sintered or injection molded. Other manufacturing techniques in which the powdered metal is melted rather than sintered are also envisioned. In at least one embodiment, the first and second electrode surface rings 142, 144 are made from, for example, cylindrical or rectangular bar stock, which is cut to length and formed into a ring. In an alternate embodiment, the first and second electrode surface rings 142, 144 are made from flat sheet stock, and a punch is used to produce a number of electrode surface rings 142, 144 from a single flat sheet. FIG. 3 shows an exemplary embodiment of the first and second electrode surface rings 142, 144 in which the two electrode surface rings are punched in a single operation such that the first and second electrode surface rings 142, 144 are attached via three tabs 148. In a particular embodiment, both the first and second electrode surface rings 142, 144 are assembled to the tubular electrode 110 with tabs 148 in place to maintain the correct spacing between the electrode surface rings 142, 144. The tabs 148 are removed after the first electrode surface ring 142 is attached to the tubular electrode 110, and after the second electrode surface rings 144 is attached to the center electrode 102. The ring 142 may also be cut into one or more semi-circular sections to accommodate fabrication, assembly, attachment and /or thermal expansion.

Figure 4:
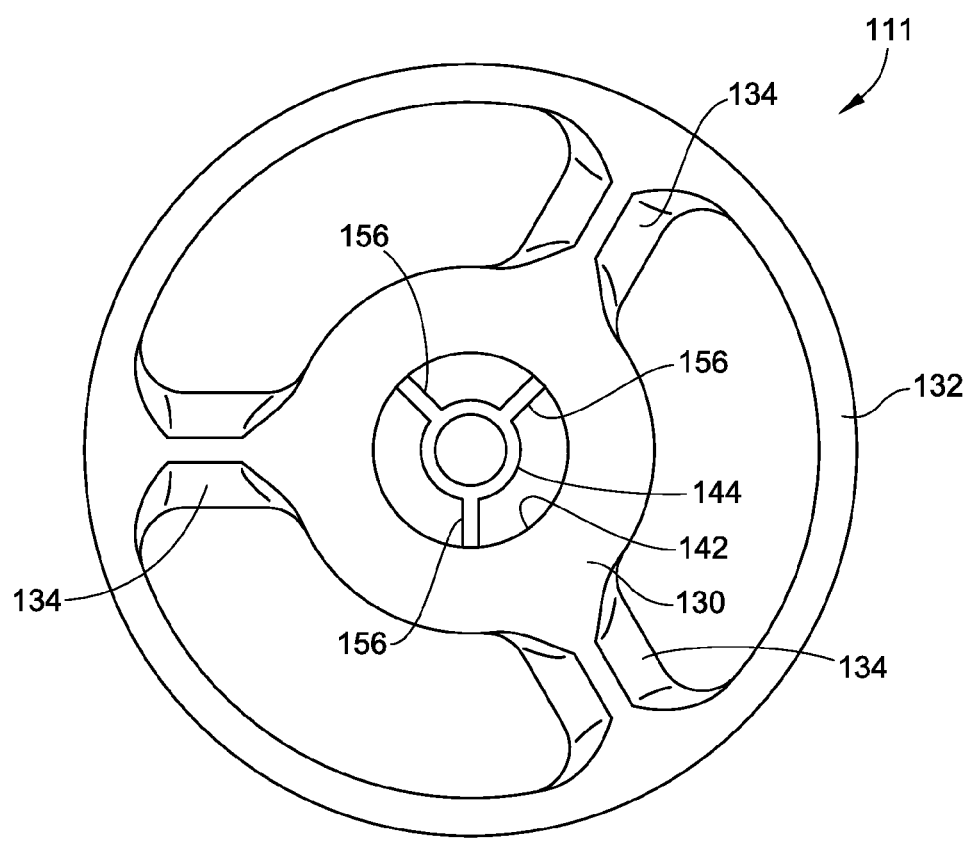
FIG. 4 is a plan view of the tubular electrode, constructed in accordance with an alternate embodiment of the invention.

An alternate embodiment of the tubular electrode is illustrated in FIG. 4. In this embodiment, the inner ring 130, outer ring 132, spokes 134 and velocity control tube 136 are substantially the same as for tubular electrode 110. However, tubular electrode 111 includes the second electrode surface ring 144 attached to the first electrode surface ring 142 by three tabs 156. As such, the correct spacing between the first and second electrode surface rings 142, 144 is maintained until assembly is completed. After assembly, the tabs 156 can be removed mechanically or by electron beam or water jet or similar method. However, in a particular embodiment, the tabs 156 can be made, for example, from a material with a substantially lower melting point that the other materials in the tubular electrode 111 or the second electrode surface ring 144. This allows for the tabs 156 to be removed by burning or melting after assembly of the tubular electrode 111 to the pre-chamber spark plug 100.

There are several methods by which the first electrode surface ring 142 can be attached to the tubular electrode 110. In a particular embodiment of the invention, the tubular electrode 110 is cast around the first electrode surface ring 142. In an alternate embodiment, a separate metal ring with a layer of precious metal or similarly suitable metal attached to an inner surface of the metal ring is assembled to the inner ring 130 of the tubular electrode 110.

Figure 5:
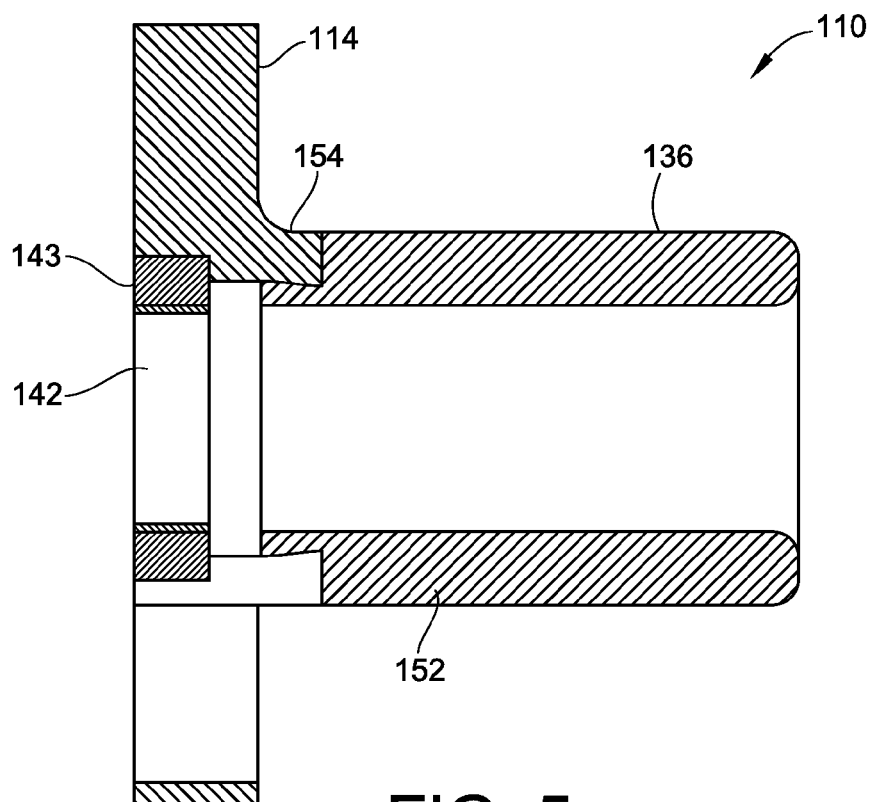
FIG. 5 is a cross-sectional view of the tubular electrode having a first electrode surface ring on a substrate material, in accordance with an embodiment of the invention.

For example, the electrode surface ring material can be deposited on, for example, a powdered metal substrate, using physical or chemical vapor deposition. For example, the powdered metal substrate may be a hollow cylinder and the electrode surface ring material can be deposited on the interior surface of the hollow cylinder. The cylinder could be sliced into a number of first electrode surface rings 142. If the same material is deposited on the outside of a smaller hollow cylinder, it could be sliced into a number of second electrode surface rings 144. Made in this fashion, the first electrode surface rings 142 could be inserted into the central opening of the tubular electrode 110 and welded or brazed in place. FIG. 5 shows a cross-sectional view of tubular electrode 110 having a first electrode surface ring 142 attached or deposited on a substrate material 143, for example a nickel alloy or highly conductive alloy. In a particular embodiment, the weld is a tack weld in one spot or a few select spots to allow for some relative movement due to the differing rates of thermal expansion for the different materials. Using the methods described above to add the precious metal to the tubular electrode 110 allows for the fabrication of the pre-chamber spark plug 100 with less of the precious metal than typically used in conventional pre-chamber spark plugs, thus making the pre-chamber spark plug 100 less expensive to manufacture than many conventional pre-chamber spark plugs.

In a further embodiment, the tubular electrode 110 can be assembled from separate components. The embodiment of FIG. 5 also shows a cross-sectional view of a particular embodiment of the tubular electrode 110 having a separate disk portion 114 and velocity control tube 136. In at least one embodiment, the velocity control tube 136 has a notched portion 152 at one end, and the notched portion is press fit into an annular receiving portion 154 in the disk portion 114. In a further embodiment, the annular receiving portion 154 could be pressed inward into the notched portion 152 of the velocity control tube 136 holding it in place. In a further embodiment, the notched portion 152 includes a annular protrusion about its circumference that fits into a divot in the annular receiving portion 154 of the tubular electrode 110 to improve the attachment between the disk portion 114 and velocity control tube 136. In alternate embodiment, the notched portion 152 is threaded along with an interior surface of the annular receiving portion 154 such that the velocity control tube 136 can be threaded into the disk portion 114.

Figure 7:
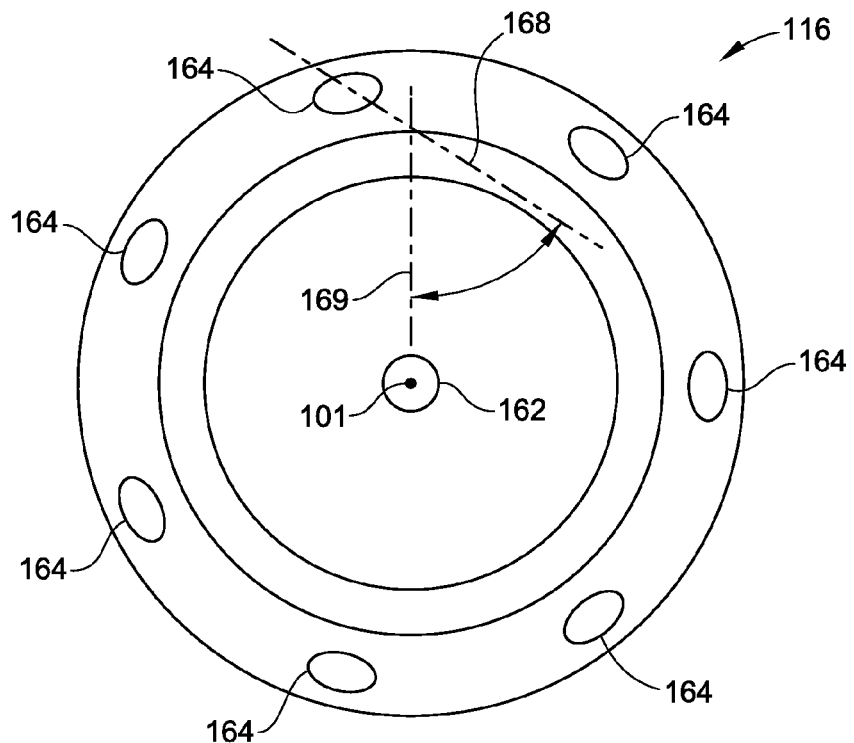
FIG. 7 is an end view of an end cap for the pre-chamber spark plug, according to a particular embodiment of the invention.
Figure 8:
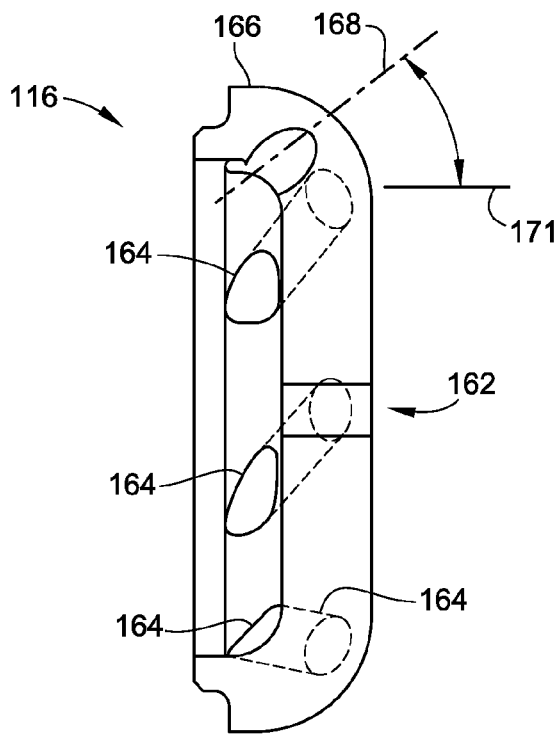
FIG. 8 is a cross-sectional view of the end cap of FIG. 7.

Referring again to FIG. 1, in operation, the air/fuel mixture is drawn into the front chamber 108 of pre-chamber spark plug 100 from the main cylinder of the engine (not shown) through a center hole 162 (see also FIGS. 7 and 8) in end cap 116, and through a plurality of periphery holes 164 (see also FIGS. 7 and 8). The air/fuel mixture drawn in through the center hole 162 flows through the velocity control tube 136 to the spark gap between center electrode 102 and tubular electrode 110 where it is ignited by an electric spark. The velocity of the air/fuel mixture causes the initial flame kernel to be transported into the back chamber 106.

A key function of the flow through the primary central hole is that this flow consists of fresh Air-Fuel charge with a low level of residuals. This primary flow forces its way into the spark gap region—uniformly—pushing the last combustion event residuals backwards and out of the spark gap region, effectively purging the spark gap of residuals, thus "controlling" the residuals within the pre-chamber. In conventional pre-chamber spark plugs, the residual gases are not "controlled" well or at all, leading to an unknown and uncontrolled mixture of fresh charge and left-over residuals at the time of spark. This represents a key source of shot-to-shot combustion variation within conventional pre-chamber spark plugs. Thus it is claimed that this design uniquely and most effectively purges the residuals backwards (away from the end cap) leading to exceptionally low COV, via "Residual Gas Control"

The air/fuel mixture drawn in through periphery holes 164 has a swirling motion due to the angled nature of the periphery holes 164. The swirling air/fuel mixture flows past the outside of the velocity control tube 136 toward the back chamber 106 where it is ignited by the flame kernel from the center hole flow. The turbulence caused by the swirling motion of the air/fuel mixture distributes the growing flame kernel around the back chamber 106 predominantly consuming the fuel in the back chamber 106. This results in a faster burn and a rapid increase in pressure inside the pre-chamber as combustion of the air/fuel mixture proceeds from the back chamber 106 to the front chamber 108. The result is a more complete burn of the air/fuel mixture and, therefore, increased pressure within the pre-chamber. This results in a high-velocity jet of flame through the center hole 162 and through the plurality of periphery holes 164 into the main combustion chamber (not shown).

In this manner, ignition is delayed by the flow of the flame kernel to the back chamber 106. The combustion process starts in the back chamber 106 and must progress through the front chamber 108 before the resultant flames project into the main combustion chamber. Because this increased ignition delay time results in a more complete burn, the process is more repeatable and has less variation, and therefore a lower COV, than in typical conventional pre-chamber spark plugs. An additional benefit of the delay in ignition is that the spark can be initiated sooner in the combustion cycle when the cylinder pressure is lower than would be the case without the ignition delay. Initiating the spark when the cylinder pressure is lower prolongs the life of the pre-chamber spark plug 100.

Further, in configuring the pre-chamber spark plug, the volume of the back chamber 106 behind the tubular electrode 110, and of the front chamber 108 in front of the tubular electrode 110 can be optimized to control the flame kernel development, and thus the ignition delay time. The ratio of volume of the front chamber 108 to that of the back chamber 106 controls the size and penetration of the flame jet that issues from the center hole 162.

Figure 6:
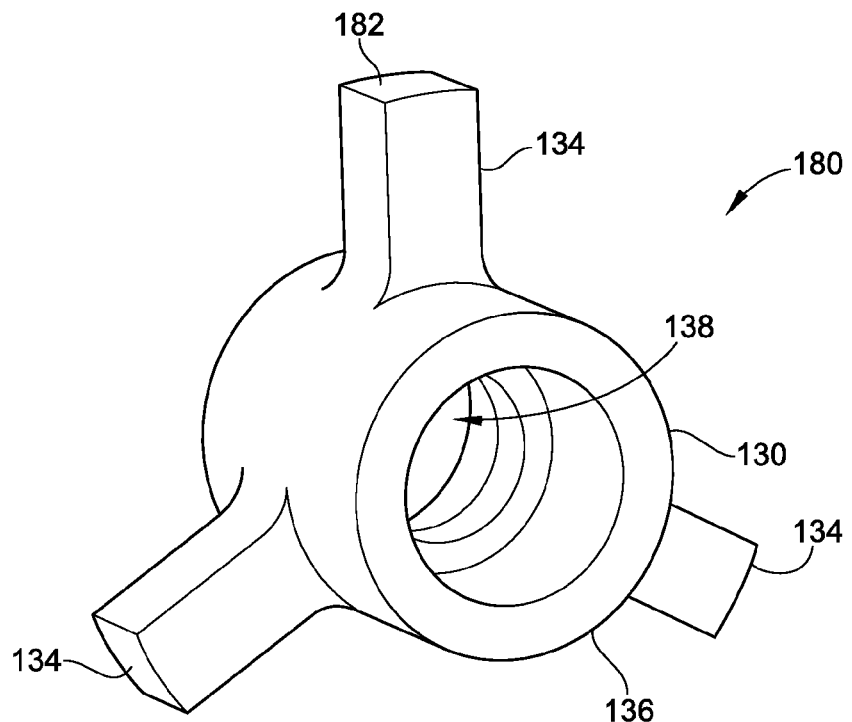
FIG. 6 is a perspective view of a tubular electrode, constructed in accordance with another embodiment of the invention.

FIG. 6 is a perspective view of a tubular electrode 180, constructed in accordance with an embodiment of the invention. Tubular electrode 180 serves as a ground electrode and is similar to tubular electrode 110, except that tubular electrode 180 has no outer ring. Tubular electrode 180 includes the inner ring 130 with a central opening 138. The inner ring 130 extends axially to form the velocity control tube 136. In the embodiment of FIG. 6, three spokes 134 extend radially outward from the exterior of the inner ring 130. In a particular embodiment, the tubular electrode 180 is assembled to the pre-chamber spark plug 100 by attaching an end 182 of each spoke 134 directly to the shell 112. The attachment may be made by welding, brazing, or the like.

FIGS. 7 and 8 show an end view and a cross-sectional view, respectively, of the end cap 116 for pre-chamber spark plug 100, according to a particular embodiment of the invention. In a particular embodiment, the end cap 116 is cup-shaped such that it protrudes slightly from the end of the shell 112. The end cap 116 has center hole 162 that, in at least one embodiment, is centered around the longitudinal axis 101 of the pre-chamber spark plug 100. The center hole 162 is configured to control the rate of flow of air/fuel mixture into the front chamber 108. The end cap 116 further includes the plurality of periphery holes 164 which may be drilled or formed in a sidewall 166 of the end cap 116. The periphery holes 164 are configured to create a swirling motion of the air/fuel mixture in the pre-combustion chamber. In an embodiment of the invention, the end cap 116 is attached to the shell 112 via welding, brazing, and the like. The end cap 116 in another preferred embodiment may also be flat (perpendicular to the shell) and or "V" shaped.

FIGS. 7 and 8 illustrate an embodiment of the end cap 116 having seven periphery holes 164 in the sidewall 166, and seven periphery hole axes 168. For the sake of simplicity, only one periphery hole axis 168 is shown in FIG. 7. FIG. 7 shows and end view of end cap 116 that includes an exemplary swirl angle for the periphery holes 164, and further includes the longitudinal axis 101 for pre-chamber spark plug 100 as it would be located, in a particular embodiment, when the end cap 116 is assembled to shell 112. FIG. 8 is a cross-sectional view of the end cap 116 and shows an exemplary penetration angle for the periphery holes 164.

Other embodiments of the end cap 116 may have more or less than seven periphery holes 164. The periphery holes 164 are angled such that none of the periphery hole axes 168 intersect the longitudinal axis 101. As stated above, FIG. 7 illustrates a swirl angle for the periphery holes 164. As shown in FIG. 7, the swirl angle is defined as the angle between the periphery hole axis 168 and a radial line 169 projecting from the center of the end cap 116 through a point on the periphery hole axis 168 midway between the ends the cylinder defined by the corresponding periphery hole 164.

In the embodiment of FIGS. 7 and 8, the swirl angle is 45 degrees but, in alternate embodiments, could be greater or lesser than 45 degrees. FIG. 8 illustrates a penetration angle for the periphery holes 164. As shown in FIG. 8, the penetration angle is defined as the angle between the periphery hole axis 168 and the longitudinal axis 101 or a line 171 parallel to the longitudinal axis 101. During engine operation, when an air-fuel mixture is introduced into the front chamber 108 of the pre-chamber, the angled nature of the periphery holes 164 produces a swirling effect on the air-fuel mixture in the pre-chamber. The exact location (i.e., on the sidewall 166) and configuration (e.g., diameter, angle) of the periphery holes 164 is dependent on the desired flow field and air-fuel distribution within the pre-combustion chamber.

Figure 9:
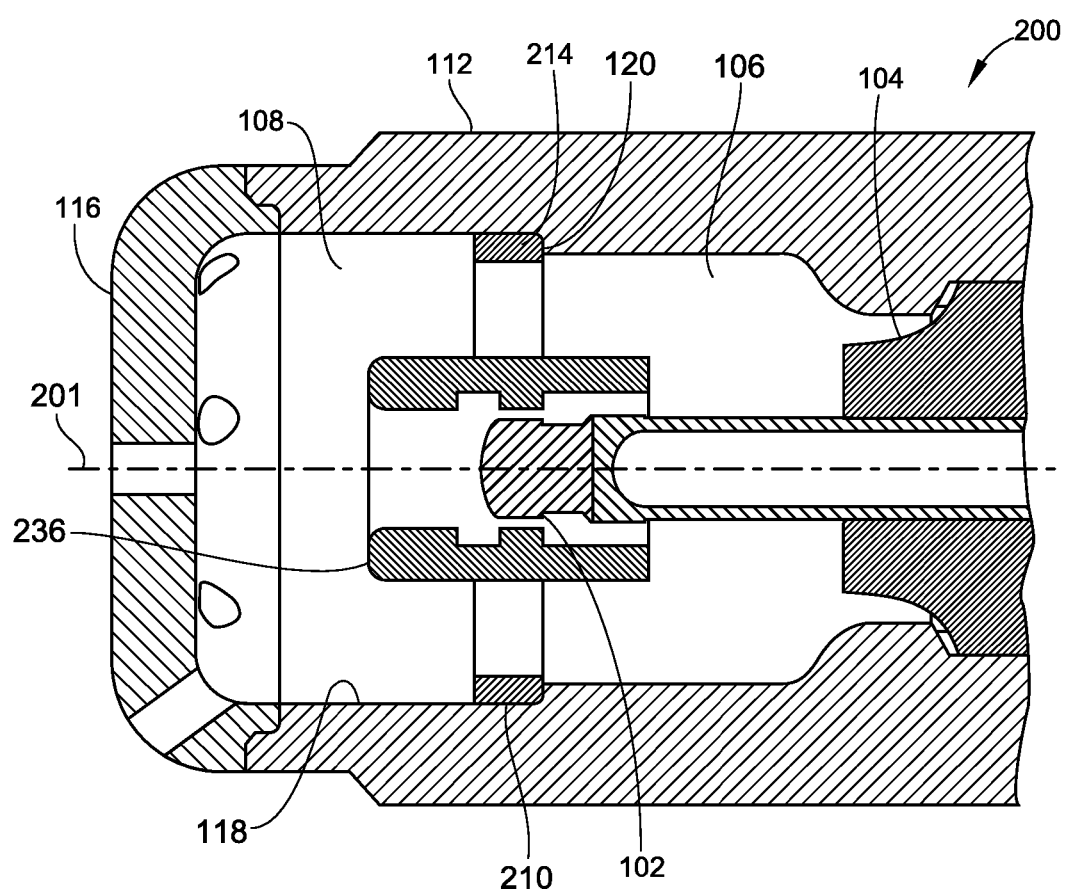
FIG. 9 is a cross-sectional view of a portion of a pre-chamber spark plug, according to a particular embodiment of the invention.

FIG. 9 is a cross-sectional view of a pre-chamber spark plug 200, constructed in accordance with an embodiment of the invention. Pre-chamber spark plug 200 has a longitudinal axis 201. The center electrode 102 that extends along the longitudinal axis 201, and further extends from the insulator 104 into the pre-chamber, divided into back chamber 106 and front chamber 108. A tubular electrode 210, disposed inside shell 112, serves as the ground electrode. The disk portion 214 of the tubular electrode 210 separates the back chamber 106 from the front chamber 108. The end cap 116 defines the end of the pre-chamber spark plug 200 and also a boundary of the front chamber 108. In a particular embodiment of the invention, an interior surface 118 of the shell 112 may have a stepped portion 120 such that the tubular electrode 210 can seat on the stepped portion 120 during assembly of the pre-chamber spark plug 200.

In operation, the pre-chamber spark plug 200 operates in a manner similar to that described above for the operation of pre-chamber spark plug 100. However, it can be seen in FIG. 9 that a tubular inner ring, or velocity control tube 236 extends axially both into the front chamber 108 and into the back chamber 106. By increasing the length of the velocity control tube 236, i.e., adding the portion that extends into the back chamber 106, the ignition delay time can be further increased. In this case, the ignition delay time is controlled by the length of the extended back portion of the velocity control tube 236, and by the flow velocity in the extended back portion of the velocity control tube 236. The flow velocity in the velocity control tube 236 is a function of the mass flow through the center port 162. The increased ignition delay time that results from the extended velocity control tube 236 allows the spark to be initiated even earlier than in the case of pre-chamber spark plug 100. Initiating the spark earlier when cylinder pressure is lower prolongs the life of the spark plug. Such a design also makes it possible to fabricate pre-chamber spark plugs having center and ground electrodes without any precious metal. This reduces the material cost and simplifies substantially the manufacture and assembly of the spark plug.

Figure 10:
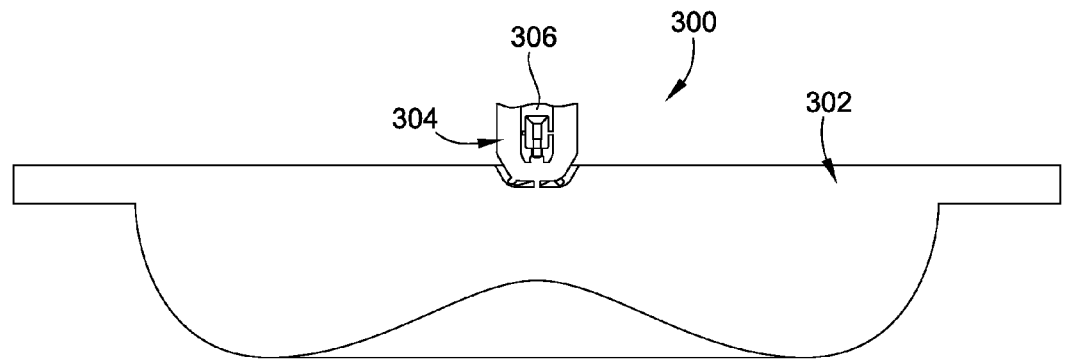
FIG. 10 is a cross-sectional view of a large bore piston cylinder assembly and a pre-chamber spark plug in accordance with a particular embodiment of the present invention.

FIG. 10 illustrates a cross-sectional view of a pre-chamber spark plug assembly 300 in accordance with another embodiment of the present invention. The pre-chamber spark plug assembly 300 includes a pre-chamber 304 in the head of large bore piston cylinder chamber 302. Within the pre-chamber 304, is a spark plug 306 adapted for the configuration of having the pre-chamber 304 in the head of a large bore piston cylinder 302.

Figure 11:
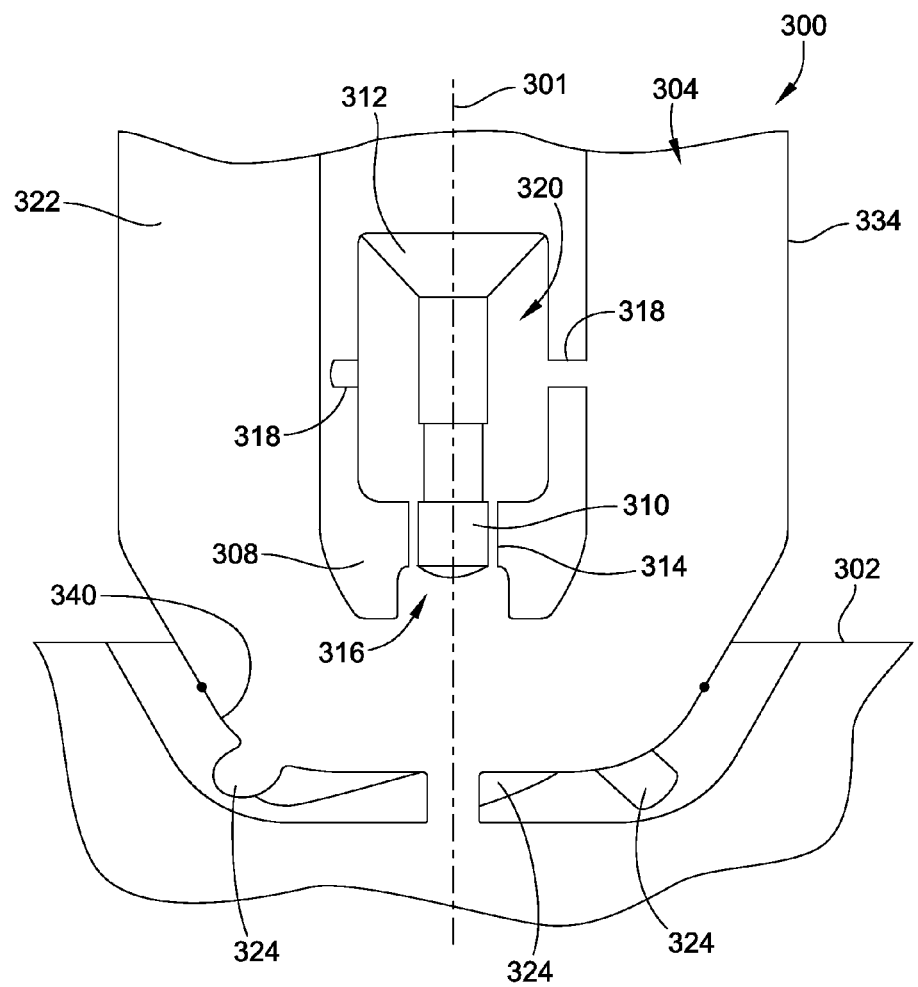
FIG. 11 is a cross-sectional view of a pre-chamber spark plug in accordance with a particular embodiment of the present invention.

FIG. 11 illustrates a close up cross-sectional view of the pre-chamber 304 of the pre-chamber spark plug assembly 300 of FIG. 10. The pre-chamber 304 is bounded by a shell 334 and connected to the cylinder chamber 302 by an end cap 340 that has a series of ventilation holes 324. The ventilation holes 324 allow a fuel and air mixture to enter the pre-chamber 304, and for a flame to exit the pre-chamber 304 into the cylinder assembly 302. While the particular embodiment of the invention shown in FIG. 11 shows three ventilation holes 324, more or less are contemplated. Additionally, the ventilation holes 324 could be in the form of slots as opposed to holes.

The pre-chamber 304 has a longitudinal axis 301 and a center electrode 310 that extends axially along the longitudinal axis 301 into a pre-combustion chamber 304. Around the center electrode, at the center electrode's 310 distal end, is the ground electrode 308. The ground electrode 308 is attached to the insulator 312, which insulates the center electrode 310 from the ground electrode 308. In certain embodiments, the center electrode 310 connects to a voltage source (not shown), and the ground electrode 308 is grounded through a connection (not shown), through the interior of the insulator 312, to the shell 334, which is electrically grounded.

Further, the ground electrode 308 forms a circular region around the distal end of the center electrode 310 forming spark gap 314. The spark gap 314 is between the outer surface of the center electrode 310 and a tubular inner ring of the of the ground electrode 308 that is spaced in surrounding relation to the center electrode 310. The insulator 312 extends axially around the center electrode 310 from above the spark gap 314 up to the top of the pre-chamber 304 forming a velocity control tube. Additionally, above the spark gap 314 are two lateral holes 318 drilled into the insulator, or by another name the velocity control tube 312, which act to ventilate a flame kernel after an ignition event.

The area around the center electrode 310, but inside the insulator 312 is referred to as a first stage 320 of the pre-chamber 304. The first stage 320 acts to restrict fuel into a small space such that a flame kernel generated by an ignition event is protected and controlled as to not cause excessive damage to the ground electrode 308 and the center electrode 310. While in this particular embodiment of the invention two lateral holes 318 are shown in the insulator 312, more or less are contemplated.

The area outside of the insulator 312 and bounded by the shell 334 is referred to as a second stage 322 of the pre-chamber 304. The second stage 322 is where the flame kernel begins to expand prior to exiting from the ventilation holes 324 into the cylinder chamber 302.

Additionally, the ground electrode 308 extends further into pre-chamber 304 than the center electrode 310. As illustrated in FIG. 11, the ground electrode 308 includes a radial offset circumferential extension extending axially past the distal end of the center electrode 310 forming an aerodynamic nose cone or by another name an aerodynamic ram 316. The aerodynamic ram 316 functions to trap the vapor flow from the main cylinder chamber 302 as it flows into the pre-chamber 304. This trapped vapor is an air/fuel mixture that is ignited at the spark gap 314.

As an aside, the spark gap 314 width can be altered to affect useable life of the spark plug. By increasing the axial length of the spark gap, the surface area of where a spark is generated will increase. Therefore, it will take longer for the material that composes the center electrode 310 and the ground electrode 308 to erode to the point that the plug itself needs to be refurbished or replaced. The drawback to increasing the width is that this shrinks the first stage and thereby makes initial ignition of the fuel more difficult.

Figure 12:
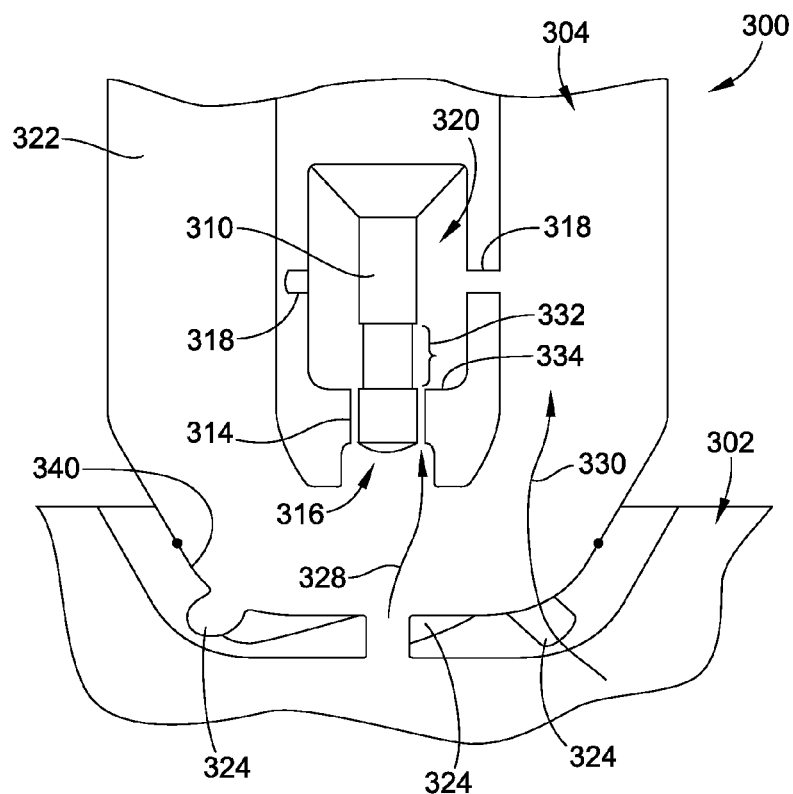
FIG. 12 is a cross-sectional view of a pre-chamber spark plug illustrating fuel flow into the pre-chamber in accordance with a particular embodiment of the present invention.

FIG. 12 illustrates the flow physics of how combustion is created and managed in the pre-chamber 304. Initially, a primary mixture of fuel and air will flow into the pre-chamber through the ventilation holes 324 from the cylinder assembly 302. The flow is created because of a pressure differential between the cylinder chamber 302 and the pre-chamber 304 created during the compression stroke of an associated engine system (not shown). The flow is composed of a primary and secondary flow 328 and 330 respectively. As the primary and second flow 328, 330 enter the pre-chamber 304, the primary and secondary flow 328, 330 purge residual fuel from previous ignition cycles from the spark gap 314 region toward the top of the pre-chamber 304. This replaces the fuel in the spark gap 314 and the second stage 322 with fresh evenly dispersed fuel.

Further, the secondary flow 330 disperses uniformly around the second stage 322 of the pre-chamber 304, and the primary flow 328 is captured by the aerodynamic ram 316. The aerodynamic ram 316 gathers the primary flow 328 around the spark gap 314. The velocity of the primary flow 328 into the spark gap is between 1 and 100 meters per second. The fuel that is part of the primary flow 328 will gather around the spark gap 314 thus creating a pressure differential between the area within the aerodynamic ram 316 and the first stage 320 causing the fuel to flow into the first stage 320 of the pre-chamber 304. In certain embodiments, a distal end of the center electrode 310 is flat to facilitate the primary flow 328 into the spark gap 314.

Additionally, fuel will flow through the lateral holes 318. The lateral holes 318 are angularly offset such that they are not perpendicular to the center axis 301. This prevents the air/fuel mixture from the secondary flow 330 from filling the first stage 320. Therefore, the pressure differential caused by aerodynamic ram 316 is not disturbed by the lateral holes 318.

Once a spark is generated in the spark gap 314, the fuel in the spark gap 314 will ignite thus creating a flame kernel. Because of the pressure differential, the flame kernel travels into the first stage 320 of the pre-chamber 304 where the flame kernel is protected from the outside environment by the relatively small size of the first stage 320. Specifically, the flame kernel moves upward into a notch 332 located in the center electrode 310. The notch 332 then introduces the flame kernel to a backwards facing step structure 334 of the ground electrode 308. As the primary flow enters the first stage 320 the backward facing step creates a recirculation zone trapping some fuel in this location that allows the flame kernel to expand slightly while also being protected from being quenched by primary flow entering the spark gap 314. Therefore, the notch 332 and the backwards facing step 334 form a flame holder that protects the flame kernel from the higher velocity primary flow 328.

Additionally, because the lateral holes 318 allow only a minimal amount of the fuel to enter the first stage 320, the flame kernel remains small. This keeps the temperature inside the first stage 320 low and minimizes damage to the ground electrode 308 and the center electrode 310.

As the flame kernel grows and consumes the fuel in the first stage 320 it travels out of the lateral holes 318 into the second stage 322 of the pre-chamber 304. The flame kernel is carried by the secondary flow 330 and wraps around the insulator 312. At this point the flame kernel begins to spread and consume the fuel in the second stage 322. The flame then expands, greatly increasing the pressure inside the pre-chamber 304, and jets out of the ventilation holes 324 into the cylinder chamber 302 where it ignites the fuel in the cylinder chamber 302.

By controlling the flow of the flame kernel around the center electrode 310, the usable lifetime of the pre-chamber spark plug assembly 300 is greatly increased. This is because the first stage surrounds the center electrode 310 and only allows the small flame kernel to burn around it, as opposed to traditional systems that have an exposed spark gap with no protection.

Figure 13:
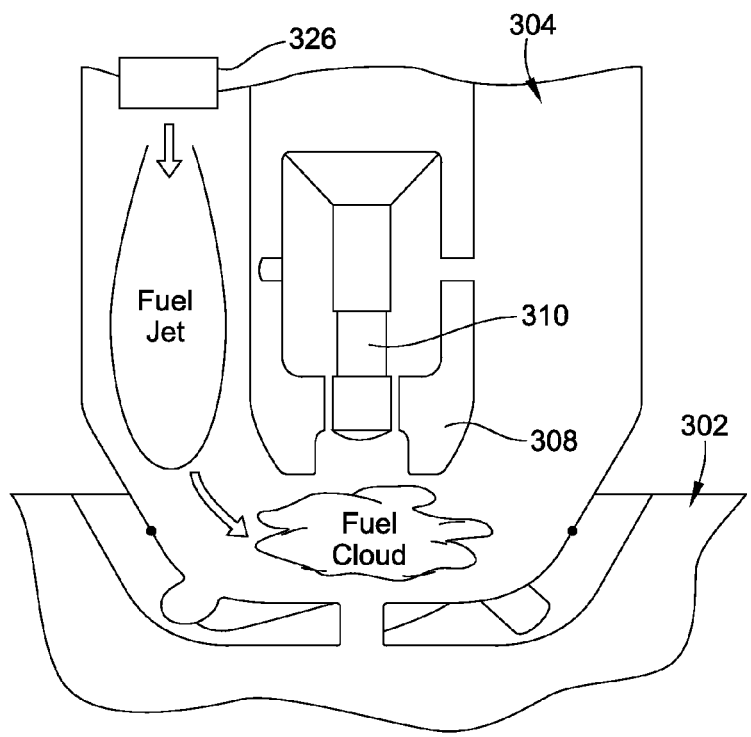
FIG. 13 is a cross-sectional view of a secondary fuel injector in the pre-chamber in accordance with a particular embodiment of the present invention.

FIG. 13 illustrates an embodiment of the present invention that includes a secondary fuel injector 326 in the pre-chamber 304. The secondary fuel injection 326 specifically injects fuel into the pre-chamber 304. Another primary fuel injector (not shown) injects fuel into the main cylinder chamber 302, which travels into the pre-chamber 304 through the ventilation holes 324. The secondary fuel injector 326 allows the user to enrich the pre-chamber mixture beyond what would typically be present from the primary injection.

Typically, the fuel to air ratio of the cylinder chamber 302 is stoichiometric, or in other words the fuel and air exist in equal quantities in the cylinder chamber 302 prior to combustion. Therefore, the fuel to air ratio within the pre-chamber 304 could be stoichiometric or less than that (leaner) due to the flow through ventilation holes 324. To guarantee a properly fuel enriched environment in the pre-chamber 304 employing the secondary fuel injector 326, the secondary fuel injector 326 increases the fuel to air ratio. Typically the increase will be such as to make the lean mixture coming from the main combustion chamber stoichiometric, or in other words it would not be a-typical to enrichen the pre-chamber fuel as air is present in the pre-chamber 304 prior to combustion to more than twice the main chamber fuel-air ratio. By enriching the pre-chamber 304, the ignition process will run hotter. However, running the ignition process hotter will decrease the useable lifetime of the center and ground electrodes 310, 308. This embodiment enables the fuel-fed (fuel-enriched) pre-chamber to run leaner with minimal or no enrichment—thus creating a Fuel-Air ratio in the pre-chamber to be much closer to the lean mixture found in the main chamber and as far away from stoichiometric enrichment as possible. Such reduction in pre-chamber enrichment leads to lower combustion temperatures in and around the spark surfaces, which leads to extended life of the spark plug.

Figure 14:
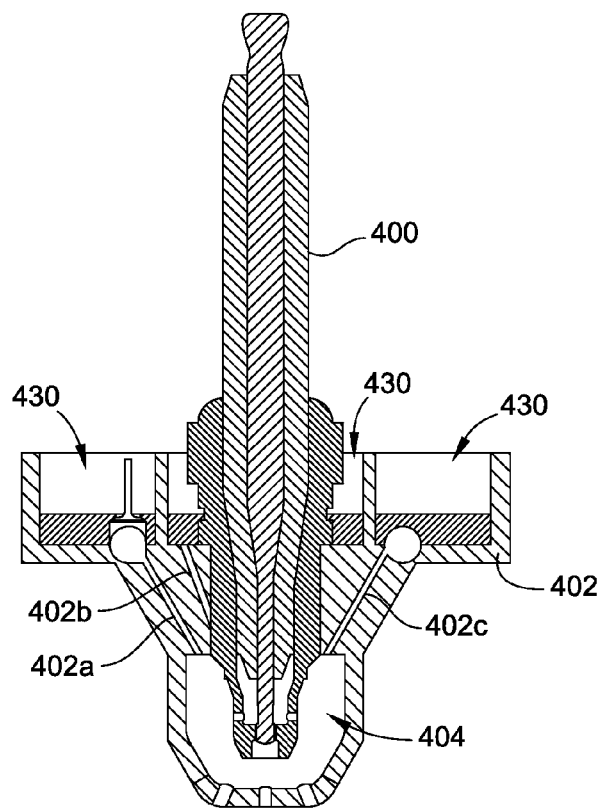
FIG. 14 is a cross-sectional view of a combined gas admission valve with igniter/spark plug in accordance with a particular embodiment of the present invention.

FIG. 14 illustrates a gas admission valve 402, integrally formed with a shell 416 of a pre-chamber 404, combined with a spark plug 400. In the particular embodiment illustrated in FIG. 14, there are three separate gas admission valves 402a, 402b, and 402c. The gas admission valves 402a, 402b, and 402c supply fuel from storage chambers 430 to the pre-chamber 404. As discussed in regard to FIG. 13, the gas admission valve 402 allows the user to adjust the richness of the fuel/air mixture in the pre-chamber 404. Further, in certain embodiments, the spark plug 400, which includes an insulator 414, a center electrode 406, and a ground electrode 408, is removable from the gas admission valve 402 portion such that quick replacement of the spark plug 400 is facilitated.

Figure 15:
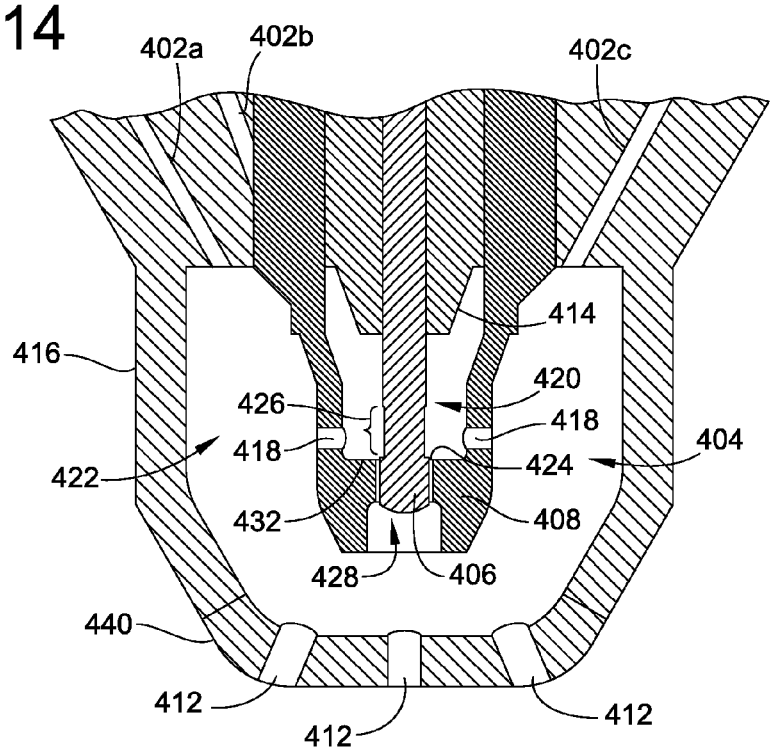
FIG. 15 is a close up cross-sectional view of an igniter/spark plug of a combined gas admission valve with an igniter, in accordance with a particular embodiment of the present invention.

FIG. 15 illustrates a close-up view of the pre-chamber 404 of FIG. 14. The pre-chamber 404 is connected to a cylinder of an engine (not shown) system by an end cap 440 with ventilation holes 412. Similar to embodiments of the invention discussed above, the pre-chamber 404 includes a center electrode 406, a ground electrode 408, ventilation holes 412, an insulator 414, and a shell 416. An aerodynamic ram 428 also exists in this embodiment. Further, the insulator includes lateral holes or slots 418. Similar to the later holes 318 (from FIG. 11), the slots 418 provide access from a first stage 420 that is defined by a cavity formed between the ground electrode 408 connected to the insulator 414 and the center electrode 406, and a second stage 422 that is defined by a cavity between the shell 416 and the ground electrode 408 attached to the insulator 414.

A first pressure differential is created by the compression stroke of an engine system forcing a fuel/air mixture into the pre-chamber 404 through the ventilation holes 412 at a velocity between one and one-hundred meters per second and directed backwards and away from the end cap 440. As this mixture flows into the pre-chamber 404, it will gather around a spark gap 424 formed between the center electrode 406 and the ground electrode 408. The relative small width of the spark gap 424 will facilitate a second pressure differential between the first stage 420 and the second stage 422 of the pre-chamber 404. Therefore, when a spark is generated at the spark gap 424, the second pressure differential will draw the flame kernel formed by the spark igniting the fuel/air mixture into the first stage 420, which has an area expansion which serves to slow the flow and create a recirculation zone formed between a notch 426 formed in the center electrode 406 and a backward facing step 432 formed in the ground electrode 408. The recirculation zone holds fuel particles in recirculation loops and acts effectively as a flame holder—preventing the blow-out of the flame kernel that is swept out of the spark gap 424 region. This flame kernel will burn the fuel in the first stage 420 until it exits through the slots 418 into the second stage 422. In the second stage 422, the flame kernel grows into a flame by consuming the fuel in the pre-chamber 404. This greatly increases the pressure in the pre-chamber 404 and causes the flame to jet from the ventilation holes 412.

Removal of the flame kernel from the spark gap region and into the flame holder, will reduce the temperature of the spark surfaces, which reduces the primary factor in spark plug loss of life, being high temperature oxidation of the spark surface in the presence of high temperature oxidizing environment. Thus the removal of the high temperature flame kernel from the spark gap 424 after the spark has occurred will extend the spark surface and thus the spark plug life.

Another function of the ventilation hole 412 in the form of central or primary hole flow is to cool the tubular ground electrode 408 and the spark area during the induction period prior to spark, since the inducted fresh charge is of a lower temperature than the residual gases in the pre-chamber 404. This further extends spark plug surface life but also reduced the surface temperatures in the pre-chamber 404, keeping temperatures below the auto-ignition temperature of the fresh charge.

Similar to the previously described embodiment, by controlling the flow of the flame kernel around the center electrode 406, the usable lifetime of the spark plug 400 is greatly increased. This is because the first stage surrounds the center electrode 406 and only allows the small flame kernel to burn around it, as opposed to traditional systems that have an exposed spark gap with no protection.

Figure 16:
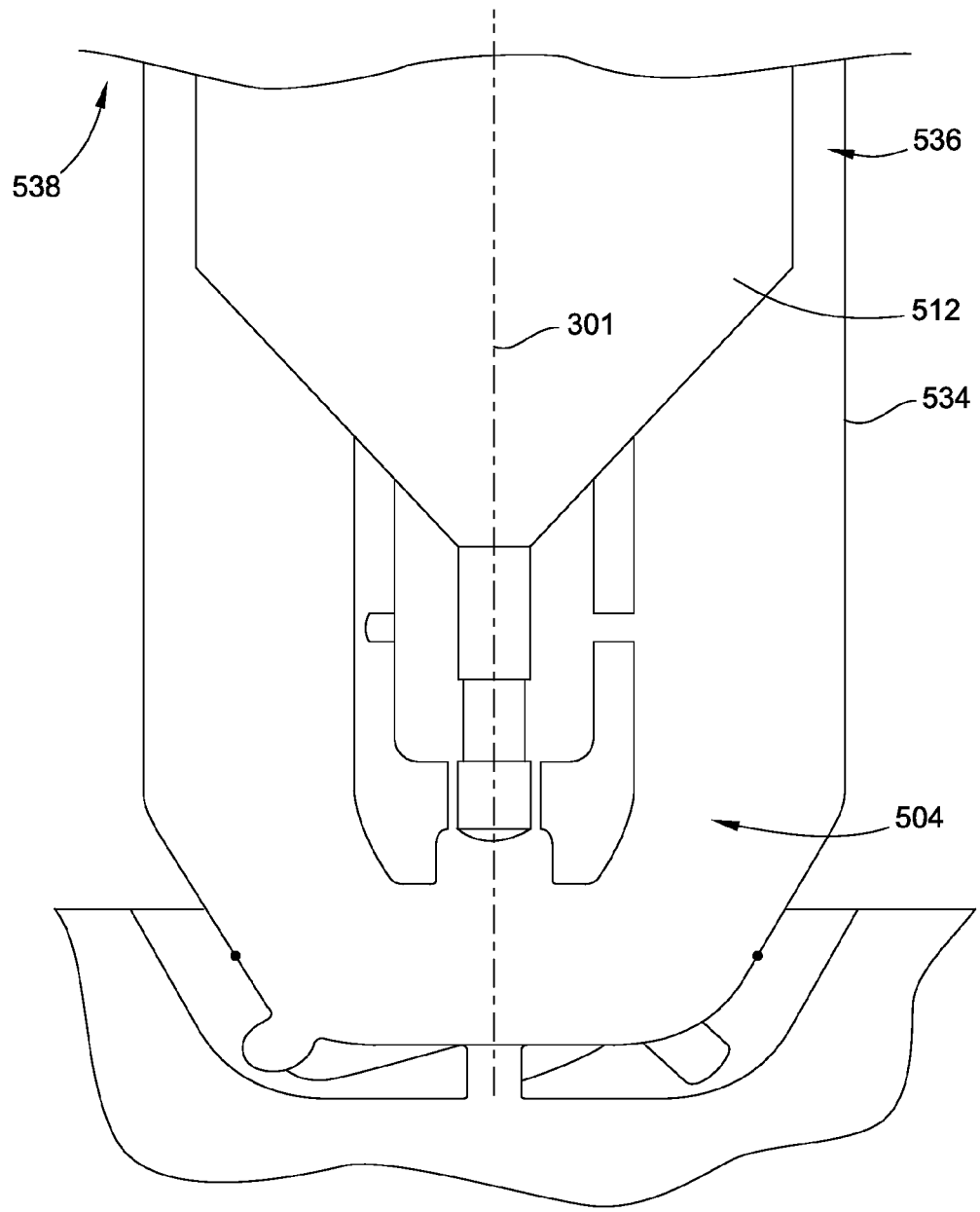
FIG. 16 is a close up cross-sectional view of a crevice of a pre-chamber in accordance with a particular embodiment of the present invention.

In another embodiment of the present invention, a crevice 536 is created between an exterior surface of a ceramic insulator 512 and an interior surface of a shell 534 near a base or root 538 of the shell 534 and insulator 512, as illustrated in FIG. 16. The crevice 536 is designed to enhance heat transfer from the hot residual fuel/gases to the cooler shell region, which is cooled on the back side by engagement with the threads of the cylinder (not illustrated) head (presumably water or oil cooled). The crevice 536 has a large surface area to volume ratio, which promotes cooling of the residual gas and thus "quenching" of the residual gas reactivity.

In one embodiment, the crevice 536 volume is designed to be approximately ⅕ to ⅒ of the pre-chamber 504 volume, such that if the pre-chamber 504 is full of residual gases, these will be compressed into the crevice 536 taking up no more space that that allowed by the compression ratio of the engine. (i.e. a 10:1 CR engine will reduce the pre-chamber 504 gas volume to ⅒ during compression).

A further embodiment may include surface area enhancement of the crevice region by a means similar to "threading" the shell 534 in the crevice 536 to further enhance the heat removal capability of the crevice 536 to cool the residual gas.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pre-chamber spark plug comprising:
    a pre-chamber housing defining an enclosed pre-chamber;
    an insulator disposed at a back of the pre-chamber;
    a center electrode in the pre-chamber housing, the center electrode comprising a portion surrounded by the insulator and a portion extending forward from the insulator into the pre-chamber;
    a ground electrode in the pre-chamber housing and surrounding the center electrode, the ground electrode comprising: an electrode portion spaced in surrounding relation to the center electrode to define a spark gap between the ground electrode and the center electrode; and
    a radial offset circumferential extension extending axially forward past the end of the center electrode forming an aerodynamic nose cone.

2. The pre-chamber spark plug of claim 1, wherein the ground electrode is attached to the insulator to form an aerodynamic ram.

3. The pre-chamber spark plug of claim 1, further comprising a first stage defined by a cavity formed between the center electrode and a velocity control tube surrounding the entire portion of the center electrode extending into the pre-chamber.

4. The pre-chamber plug of claim 3, further comprising a second stage defined by a cavity between the velocity control tube and the pre-chamber housing.

5. The pre-chamber plug of claim 4, wherein the velocity control tube comprises a lateral opening exposing the first stage to the second stage and configured to allow a flame kernel to exit the first stage and enter the second stage.

6. The pre-chamber of claim 5, wherein the lateral opening is angled such that the lateral opening has a longitudinal axis that is neither perpendicular nor parallel to a longitudinal axis of the pre-chamber spark plug and does not intersect the longitudinal axis of the pre-chamber spark plug.

7. The pre-chamber spark plug of claim 1, wherein the shape of the aerodynamic nose cone is configured to facilitate a flow of an air/fuel mixture through the spark gap.

8. The pre-chamber spark plug of claim 1, comprising an opening in the pre-chamber housing configured to direct a primary flow of an air/fuel mixture into the aerodynamic nose cone at a velocity between one and one-hundred meters per second.

9. The pre-chamber spark plug of claim 8, comprising a second opening in the pre-chamber housing configured to cause a secondary flow of the air/fuel mixture into the pre-chamber to swirl about the pre-chamber.

10. The pre-chamber spark plug of claim 9, wherein the second opening comprises a plurality of second openings angled such that each has a longitudinal axis that is neither perpendicular nor parallel to a longitudinal axis of the pre-chamber spark plug and does not intersect the longitudinal axis of the pre-chamber spark plug.

11. The pre-chamber spark plug of claim 1, further comprising a fuel injector nozzle in the pre-chamber configured to enrich a fuel to air ratio of the pre-chamber.

12. The pre-chamber spark plug of claim 1, wherein a surface of the center electrode and a surface of the ground electrode is selected from the group consisting of: a nickel allow, a platinum alloy, and an iridium alloy.

13. The pre-chamber spark plug of claim 1, wherein a front end of the center electrode is a flat surface.

14. The pre-chamber spark plug of claim 1, further comprising a crevice formed between an exterior surface of the insulator and an interior surface of the pre-chamber housing.

15. The pre-chamber spark plug of claim 14, further comprising a root of the pre-chamber housing, wherein the pre-chamber housing extends from the root and the crevice is proximate the root.

16. The pre-chamber spark plug of claim 14, wherein a volume of space defined by the crevice is 1/5 to 1/10 of a total volume of the pre-chamber.

17. The pre-chamber spark plug of claim 3, wherein the center electrode includes a notch and the ground electrode forms a backwards facing step that faces the notch forming a flame holder in the first stage.

18. A method of facilitating combustion in an internal combustion engine using the pre-chamber spark plug of claim 1, the method comprising:
receiving a primary flow of air/fuel mixture through a first opening into the pre-chamber of the pre-chamber spark plug of claim 1, to permit a primary flow of the air/fuel mixture into the spark gap of the pre-chamber;
igniting the air/fuel mixture, wherein an ignition event produces a flame kernel;
transporting the flame kernel to a first stage of the pre-chamber wherein the first stage of the pre-chamber is defined by a cavity disposed between a tube surrounding the center electrode and the center electrode;
receiving a secondary flow of the air/fuel mixture into the pre-chamber through a second opening into the pre-chamber to disperse the secondary flow throughout a second stage of the pre-chamber, wherein the second stage of the pre-chamber is defined by a cavity disposed outside of the ground electrode;
wherein the flame kernel travels from the first stage to the second stage; and
igniting the secondary flow of the air/fuel mixture causing a flame jet to issue from the first and second openings.

19. The method of claim 18, wherein the flame kernel travels from the first stage to the second stage through lateral openings in an insulator.

20. The method of claim 18, wherein receiving the secondary flow comprises receiving the secondary flow into the pre-chamber through a plurality of second openings having a longitudinal axis that is not parallel with, perpendicular to, and does not intersect a longitudinal axis of the pre-chamber spark plug.

21. The method of claim 18, wherein the primary flow of the air/fuel mixture into the spark gap has a velocity between one and one-hundred meters per second.

22. The method of claim 18, wherein the primary and secondary flow of the air/fuel mixture purges residual amounts of fuel from the spark gap.

23. The method of claim 21, wherein primary flow cools the spark gap and the ground electrode.

24. The method of claim 18, further comprising:
injecting fuel into the pre-chamber via a fuel injector nozzle in the pre-chamber and enriching a fuel to air ratio of the pre-chamber.

25. The method of claim 18, wherein the primary flow of the air/fuel mixture flows into an aerodynamic ram surrounding a distal end of the center electrode.

26. A pre-chamber spark plug, comprising:
a pre-chamber housing defining an enclosed pre-chamber;
an insulator disposed within the pre-chamber;
a center electrode extending from the insulator into the pre-chamber;
a ground electrode in the pre-chamber, comprising:
an inner ring spaced in surrounding relation to the center electrode forming a spark gap therebetween; and
a radial offset circumferential extension extending axially forward past the end of the center electrode.

27. The pre-chamber spark plug of claim 26, further comprising a gas admission valve integrally formed with the pre-chamber housing, wherein the gas admission valve dispenses fuel from storage chambers into the pre-chamber housing.

28. The pre-chamber spark plug of claim 27, wherein the insulator, the center electrode, and the ground electrode are removable from the gas admission valve and the pre-chamber housing.

29. The pre-chamber spark plug of claim 26, further comprising a plurality of openings in the pre-chamber housing configured to connect the end cap to a cylinder chamber.

30. The pre-chamber spark plug of claim 29, further comprising a first stage of the pre-chamber that is defined by a cavity spaced between an inner surface of the ground electrode and an outer surface of the center electrode.

31. The pre-chamber spark plug of claim 30, further comprising a second stage of the pre-chamber that is defined by a cavity spaced between an inner surface of the pre-chamber housing and an outer surface of the ground electrode.

32. The pre-chamber spark plug of claim 31, further comprising a lateral opening in the insulator that connect the first stage to the second stage.

33. The pre-chamber spark plug of claim 32, wherein the plurality of openings in the pre-chamber housing are configured to direct a primary flow of air/fuel mixture into the spark gap and direct a secondary flow of the air/fuel mixture into the second stage of the pre-chamber.

34. The pre-chamber spark plug of claim 33, wherein the primary flow of the air/fuel mixture has a velocity between one and one-hundred meters per second.

35. The pre-chamber spark plug of claim 1, wherein the radial offset circumferential extension comprises insulator.

36. The pre-chamber spark plug of claim 1, comprising a tube surrounding the entire portion of center electrode in the pre-chamber, the tube comprising the radial offset circumferential extension.

* * * * *

UNITED STATES PATENT AND TRADEMARK OFFICE
CERTIFICATE OF CORRECTION

PATENT NO. : 9,476,347 B2
APPLICATION NO. : 13/347448
DATED : October 25, 2016
INVENTOR(S) : Domenico Chiera, David C. Petruska and Gregory James Hampson Page 1 of 1

It is certified that error appears in the above-identified patent and that said Letters Patent is hereby corrected as shown below:

In the specification

Column 3, Line 51, after "mm" insert -- . --

Column 8, Line 60, after "Control"" insert -- . --

Column 9, Line 63, replace "and or" with -- and/or --

Column 11, Line 41, replace "of the of the" with -- of the --

Column 15, Line 22, replace "that that" with -- that --

In the claims

Column 16, Line 67, replace "allow," with -- alloy, --

Signed and Sealed this
Twentieth Day of December, 2016

Michelle K. Lee
*Director of the United States Patent and Trademark Office*